United States Patent [19]

Outa et al.

[11] Patent Number: 5,633,952
[45] Date of Patent: May 27, 1997

[54] IDENTIFICATION OF A PARTICULAR COLOR IMAGE USING COLOR DISTRIBUTION, AND CIRCUITRY FOR SAME

[75] Inventors: Kenichi Outa, Kawasaki; Masahiro Funada; Yoichi Takaragi, both of Yokohama; Eiji Ohta, Fujisawa, all of Japan

[73] Assignee: Canon Kabushiki Kaisha, Tokyo, Japan

[21] Appl. No.: 446,557

[22] Filed: May 19, 1995

Related U.S. Application Data

[63] Continuation of Ser. No. 194,621, Feb. 7, 1994, abandoned, and Ser. No. 715,922, Jun. 14, 1991, abandoned.

[30] Foreign Application Priority Data

| Jun. 22, 1990 | [JP] | Japan | 2-164905 |
| Nov. 30, 1990 | [JP] | Japan | 2-330887 |
| Nov. 30, 1990 | [JP] | Japan | 2-330891 |

[51] Int. Cl.$^6$ .............. G06K 9/00; G03G 21/00
[52] U.S. Cl. .............. 382/165; 382/191; 399/54; 399/42
[58] Field of Search .............. 382/165, 191–194, 382/271; 355/201; 358/401, 501

[56] References Cited

U.S. PATENT DOCUMENTS

| 4,090,243 | 5/1978 | Kotera et al. ............... 382/17 |
| 4,618,257 | 10/1986 | Bayne et al. ............... 382/7 |
| 4,962,540 | 10/1990 | Tsujiuchi et al. ............... 382/17 |
| 5,216,724 | 6/1993 | Suzuki et al. ............... 382/165 |
| 5,424,807 | 6/1995 | Ohmura ............... 355/201 |
| 5,434,649 | 7/1995 | Hasuo et al. ............... 382/165 |

FOREIGN PATENT DOCUMENTS

| 294497 | 12/1988 | European Pat. Off. . |
| 319525 | 6/1989 | European Pat. Off. . |
| 342060 | 11/1989 | European Pat. Off. . |
| 3239995 | 5/1984 | Germany . |

*Primary Examiner*—Leo Boudreau
*Assistant Examiner*—Bhavesh Mehta
*Attorney, Agent, or Firm*—Fitzpatrick, Cella, Harper & Scinto

[57] ABSTRACT

An image processing apparatus comprises: an input device for supplying color image information; a discrimination unit to discriminate whether the color image information includes a predetermined image or not in accordance with a color distribution of the color image information supplied by the input device; and a processing circuit to process the color image information in accordance with the result of the discrimination of the discriminating means. The color image information is constructed by a plurality of color component signals. The color distribution is a distribution of the color image information in a color space.

12 Claims, 25 Drawing Sheets

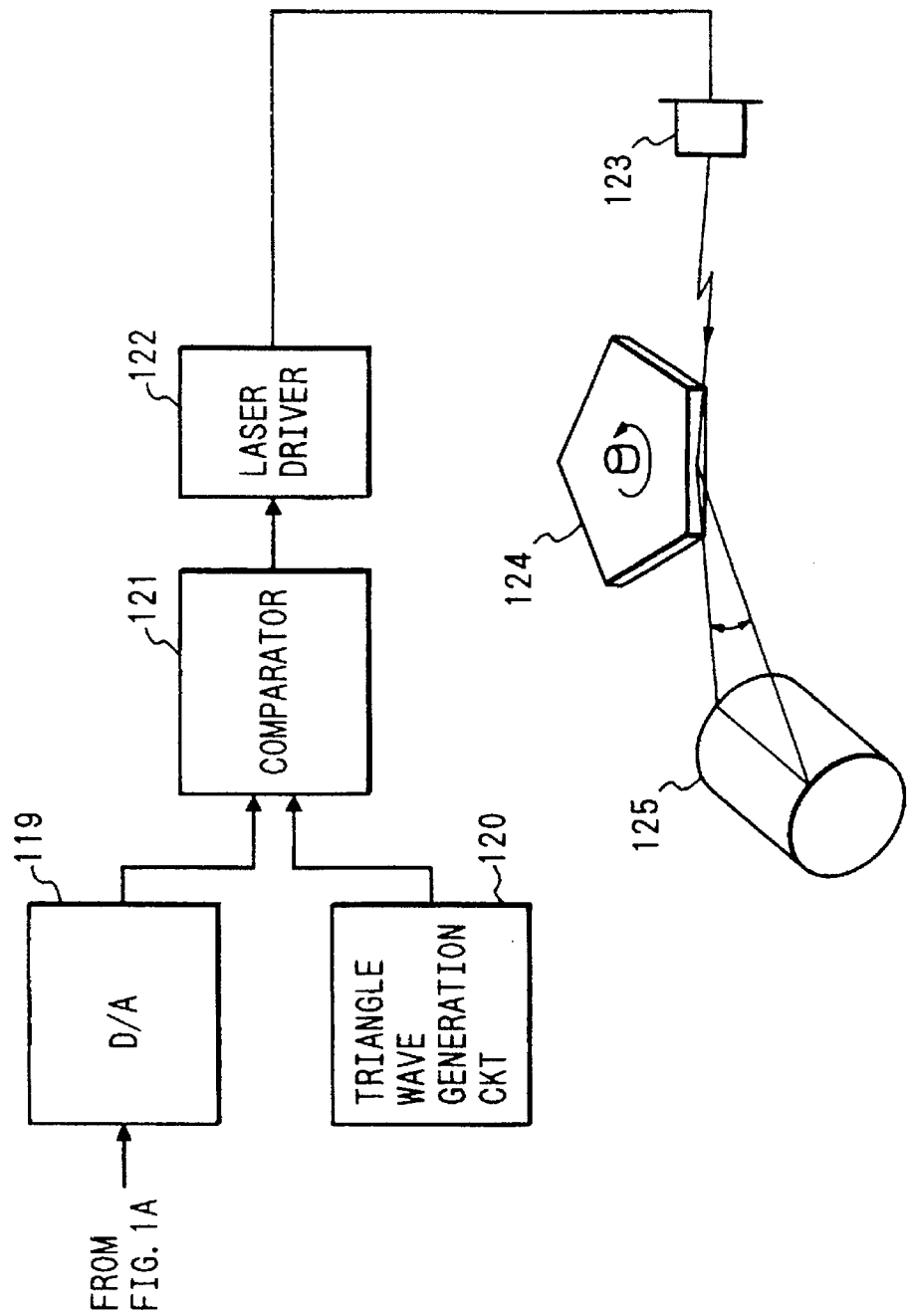

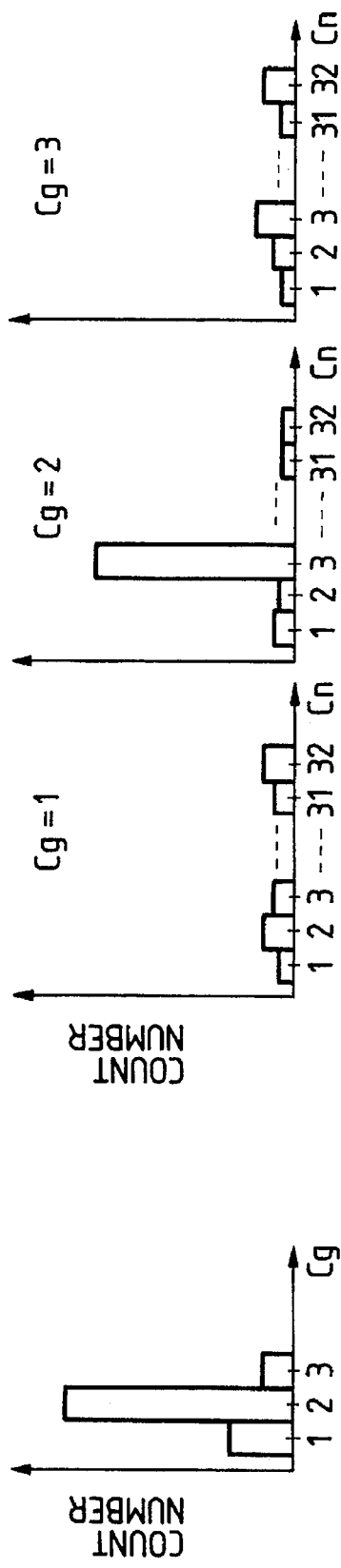
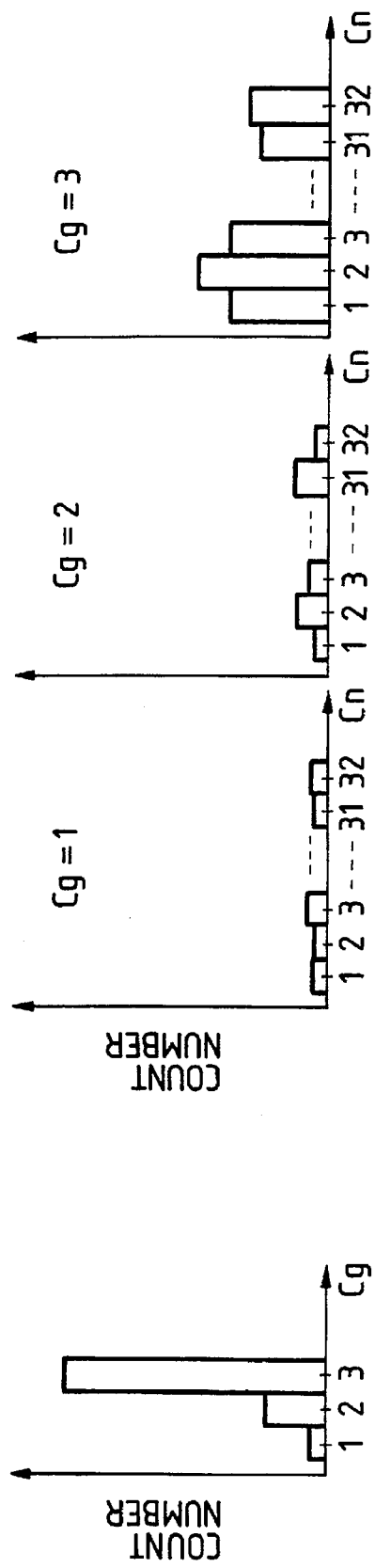

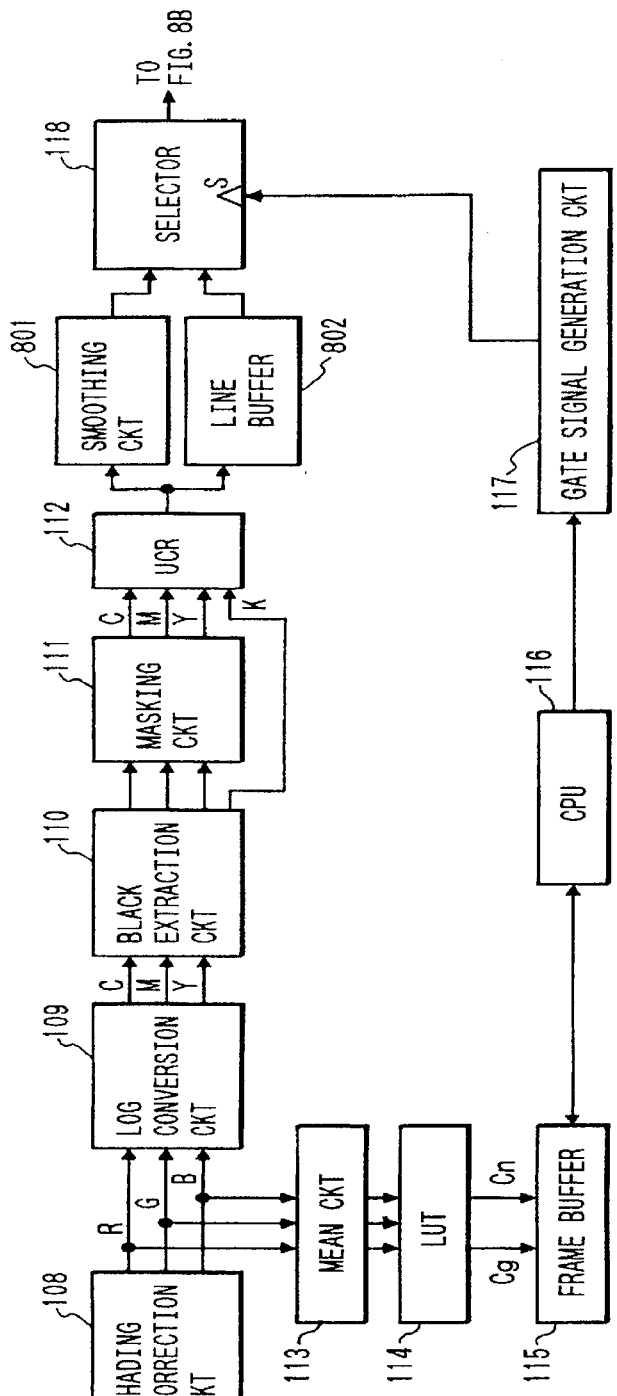

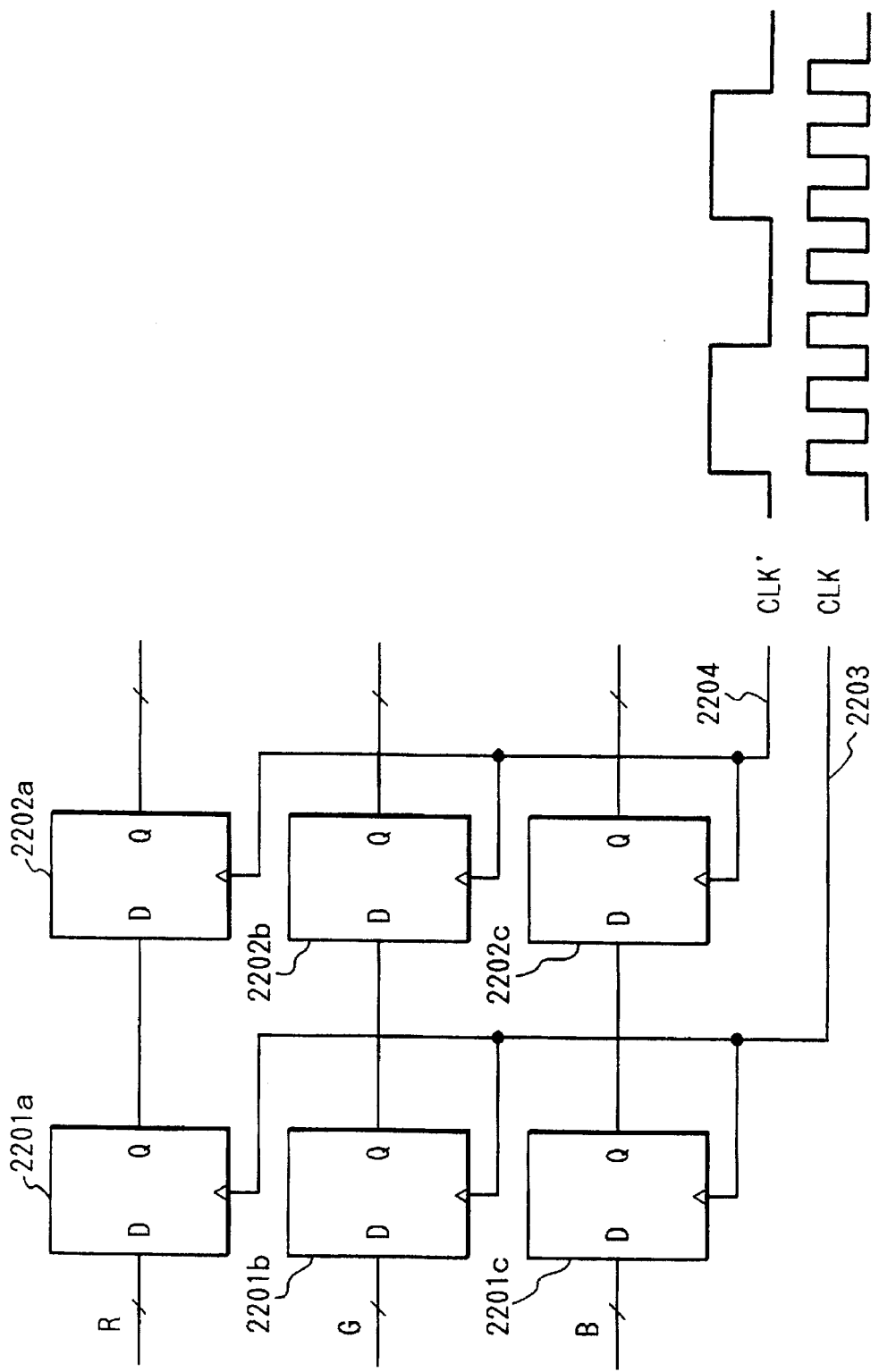

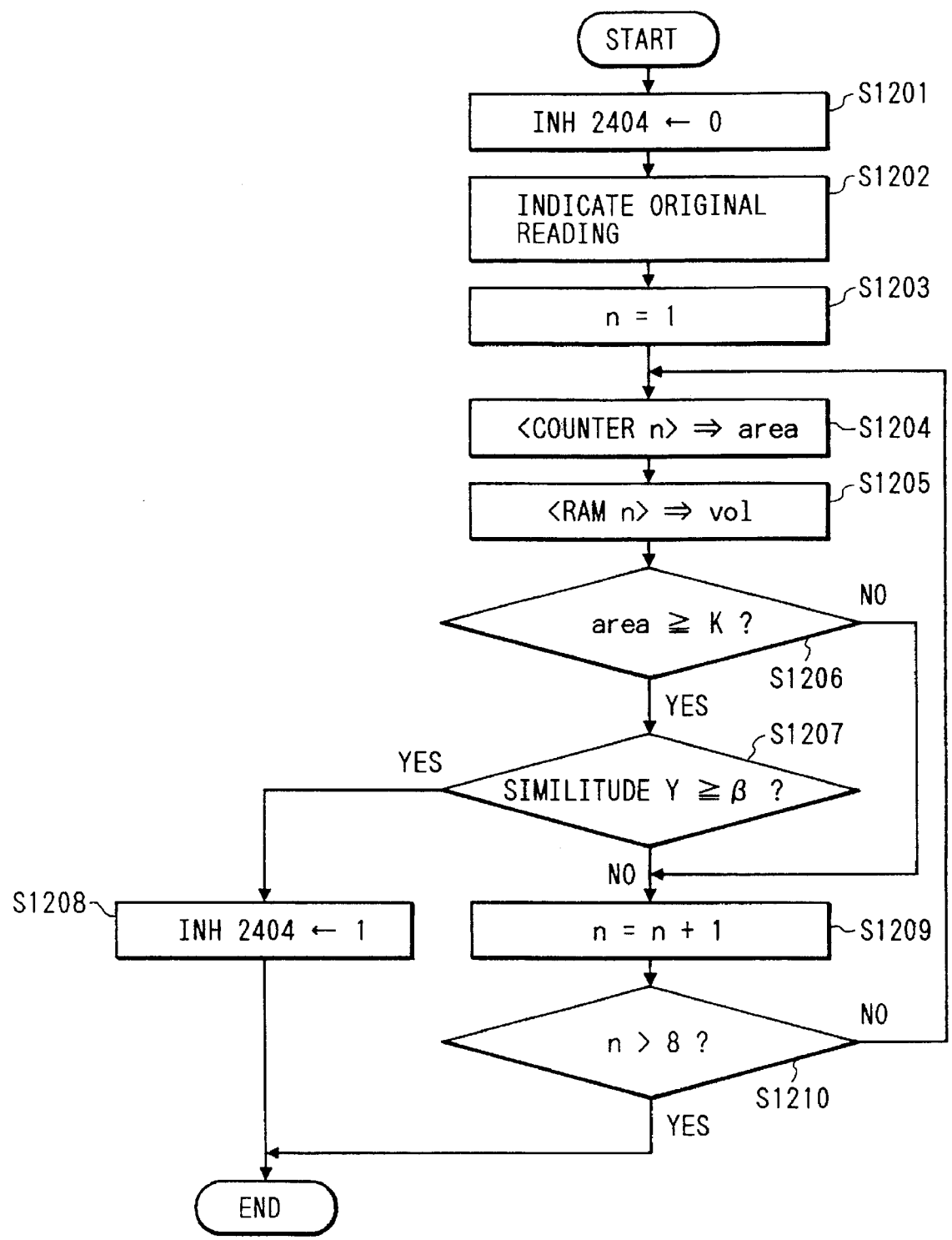

IDENTIFICATION OF A PARTICULAR COLOR IMAGE USING COLOR DISTRIBUTION, AND CIRCUITRY FOR SAME

This application is a continuation of application Ser. No. 08/194,621, filed Feb. 7, 1994, now abandoned, and is a continuation application of Ser. No. 07/715,922, filed Jun. 14, 1991, abandoned.

BACKGROUND OF THE INVENTION

1. Field of the Invention

The present invention relates to a color image processing apparatus and, more particularly, to a color image processing apparatus having a function to judge a specific original.

2. Related Background Art

In recent years, as the diffusion and realization of high picture quality color original copying apparatus progress, a fear that forgery crime of bank notes, stocks and bonds, or the like is rising. To prevent such forgery, there has been proposed a method in U.S. patent application Ser. No. 478,280 whereby a pattern of a special shape is extracted from an output of a line sensor reading an original and is compared with predetermined template data, and the presence or absence of a bank note or the like is detected and, in the case where the presence of a bank note is detected, the copying operation is interrupted.

Techniques to prevent such forgery of bank notes or the like have been proposed in U.S. patent applications Ser. Nos. 351,165 and 426,044.

However, generally, a position, an angle, and the like of an original put on an original base plate of a copying apparatus are not known at all and the original to be detected mixedly exists together with other originals, so that it is extremely difficult to extract a pattern of a desired specific shape from those originals.

Even if the extraction of the desired pattern has succeeded, the pattern as an object to be extracted differs depending on the kind (e.g., denomination and issuing, country, of the bank note. The pattern matching process needs to be performed in consideration of each possible kind. Thus, the amount of data to be processed and a processing time are extremely large and long.

Further, the data amount of a template for the pattern matching increases as the number of patterns to be extracted increases. The necessary memory capacity is also very large.

On the other hand, in such apparatus, generally, a process to convert a color component of a color original into a predetermined value is effective means for discriminating a color tone of the original. For instance, when considering the case where a check is made to see if a special color tone is included in the original or not, and if it is included, the copying operation is stopped, a construction as shown in FIG. 24 is considered.

The color separated R, G, and B signals are A/D converted by an A/D converter 1301 and are subsequently shading-corrected by a shading correction circuit 1302. Output signals of the shading correction circuit 1302 are sent to a logarithm (log) converter 1303 and a lookup table (hereinafter, referred to as an LUT) 1306. Output signals from the log converter 1303 are transmitted through a masking circuit 1304 and an undercolor removal circuit (hereinafter, referred to as a UCR circuit) 1305, so that they are converted into Y, M, C, and K signals for printing and output, and a copy image is formed by those signals.

On the other hand, data of 0 or 1 indicating whether the input R, G, and B signals correspond to the color of the specific original or not has previously been written in the LUT 1306. When they correspond to the original color, the "1" signal is generated. Reference numeral 1307 denotes a counter to count the number of times this signal has the value "1" and 1308 indicates a comparator for comparing that count value with a predetermined threshold value and for outputting a "1" signal when the count value is larger than the threshold value. When the "1" signal is generated from the comparator, a selector 1309 stops the generation of the image signal and replaces it with a fixed value such as 255, thereby interrupting the formation of a copy image.

In the above construction, when it is assumed that each of the input R, G, and B signals consists of seven bits, the LUT 1306 needs a capacity of 2 Mbits. If the lookup table of such a large capacity is made operative on a pixel unit basis of an original image, however, a response time of tens of nanoseconds is required. There is a drawback that it is impossible to cope with such a response time by means of a cheap EPROM or the like.

SUMMARY OF THE INVENTION

It is an object of the invention to eliminate the drawbacks of the conventional techniques mentioned above.

That is, another object of the invention is to provide an image processing apparatus which can accurately discriminate a specific original.

To accomplish the above objects, according to the invention, there is shown an image processing apparatus comprising: input means for inputting color image information; discriminating means for discriminating whether the color image information includes a predetermined image or not in accordance with a color distribution of the color image information which has been input from the input means; and processing means for processing the color image information in accordance with a result of the discrimination by the discriminating means.

There is also shown an image processing method comprising the steps of: inputting color image information; and discriminating whether the color image information includes a predetermined image or not in accordance with a color distribution of the input color image information.

Still another object of the invention is to enable a plurality of specific originals to be simultaneously discriminated.

To accomplish the above object, according to the invention, there is shown an image processing apparatus comprising: converting means for converting color image information into a plurality of code data according to the color information; processing means for collecting the code data in a predetermined area and for forming a histogram; discriminating means for discriminating whether an image represented by the color image information is a predetermined image or not on the basis of the histogram; and control means for controlling a process of the image information in accordance with a result of the discrimination by the discriminating means.

Still another object of the invention is to provide an image processing apparatus which can reconcile the matching of a capacity of an LUT and a response time.

Yet another object of the invention is to provide an image processing apparatus suitable for a high speed process.

To accomplish the above object, according to the invention, there is shown an image processing apparatus comprising: input means for inputting a plurality of color component signals; lookup table means which uses the plurality of color component signals as addresses and outputs data to discriminate a similarity between an image represented by the plurality of color component signals and a predetermined image; and control means for controlling a processing of the plurality of color component signals on the basis of output data of the lookup table means.

Still another object of the invention is to effectively prevent a forgery of bank notes or the like.

To accomplish the above object, according to the invention, there is shown an image processing apparatus comprising: reading means for scanning an original image and for generating image data; first discriminating means for discriminating sameness (or identity) between the original image and a predetermined image on the basis of the image data generated from the reading means; and processing means for processing the image data, wherein the reading means generates image data for the discrimination by the discriminating means by the first scan and generates image data for the processing by the processing means by the second scan, and the apparatus further includes second discriminating means for discriminating sameness (or identity) between an object of the first scan and an object of the second scan.

Yet another object of the invention is to provide an apparatus of a simple construction having a small circuit scale.

To accomplish the above object, according to the invention, there is shown an image processing apparatus comprising: input means for inputting a plurality of color component signals each consisting of n bits; converting means for converting the color component signals into color component signals each consisting of m bits (n>m); and discriminating means for discriminating sameness (or identity) between an image represented by the color component signals which have been supplied by the input means and a predetermined image on the basis of the m-bit color component signals.

There is also shown an image processing apparatus comprising: input means for inputting image data; thinning means for spatially thinning out the image data which has been supplied from the input means; table converting means for generating data which is used to discriminate whether an input original is a specific original or not on the basis of the image data which has been thinned out by the thinning means; and control means for controlling processing of the image data supplied from the input means on the basis of an output of the table converting means.

The above and other objects and features of the present invention will become apparent from the following detailed description and the appended claims taken together with the accompanying drawings.

BRIEF DESCRIPTION OF THE DRAWINGS

FIG. 1, consisting of FIGS. 1A and 1B is a diagram showing an example of a construction of the invention;

FIGS. 6-1A to 6-1D and 6-2A to 6-2D are diagrams showing examples of histograms;

FIG. 14 is a circuit diagram showing a construction of a thinning circuit 2111 according to the sixth embodiment;

FIG. 15 is a flowchart for explaining the operation by a CPU in the sixth embodiment;

DETAILED DESCRIPTION OF THE PREFERRED EMBODIMENTS

<First embodiment>

According to the following embodiment of the invention, attention is paid to the color constructing a bank note or the like. A hue in a certain limited window in an original image and a distribution are extracted, thereby detecting the presence or absence of the bank note or the like. Further, if it is determined that the bank note or the like exists, the image in the window is generated in a format different from the ordinary format, thereby preventing a forgery.

This embodiment of the invention will now be described in detail hereinbelow with reference to the drawings.

Figures 1, 1A:
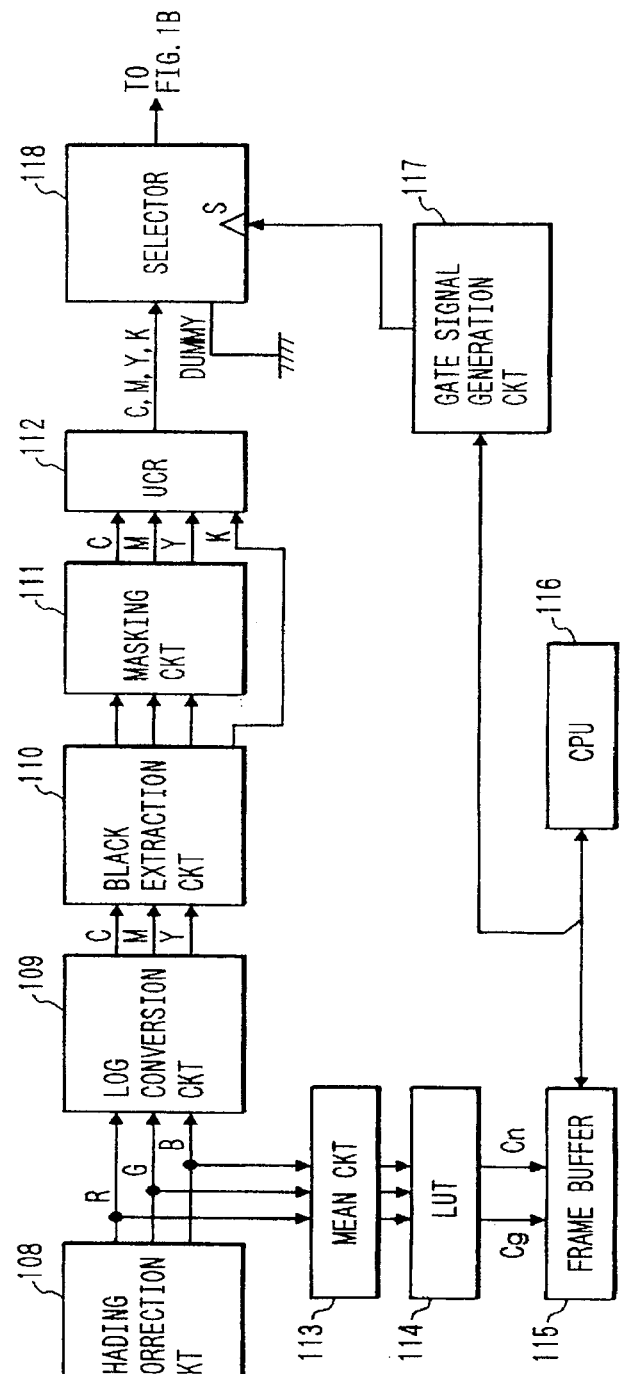

FIG. 1A and 1B are block diagrams showing a construction of the first embodiment of the invention. An original 102 put on an original base glass 101 is irradiated by a halogen lamp 103 for illuminating an original. An image of the original is formed onto a CCD line sensor 105 by a rod lens array 104. Color separation filters of R, G, and B are dot-sequentially coated onto the CCD line sensor 105. The sensor 105 generates color separation signals of the original at a pixel density of about 400 d.p.i. (dots per inch). For instance, a line sensor which is constructed by arranging three line sensors of R, G, and B in parallel can also be used as a line sensor 105. The component elements 103 to 105 are scanned in the direction shown by an arrow and the original image is sequentially read out line by line and is generated. A sample and hold circuit (S/H circuit) 106 samples and holds an output signal of the CCD line sensor 105 every pixel. An A/D converter 107 converts analog signals from the S/H circuit 106 into digital signals. A shading correction circuit 108 corrects an output fluctuation due to sensitivity variation among the pixels of the CCD line sensor. R, G, and B signals which are generated from the shading correction circuit 108 are converted into the C (cyan), M (magenta), and Y (yellow) signals of complementary colors by a logarithm (log) conversion circuit 109. A minimum value K (black) of C, M, and Y is extracted by a black extraction circuit 110. A masking circuit 111 and a UCR (undercolor removal) circuit 112 execute well-known color correcting processes. The image data is subsequently transferred to a selector 118 as an area-sequential signal of C, M, Y, and K.

On the other hand, the R, G, and B output signals of the shading correction circuit 108 are averaged by a mean circuit 113 on the basis of N×N pixels (N=about 8 to 32 pixels). Output signals of the mean circuit 113 are transmitted through a lookup table (LUT) 114, which will be explained hereinbelow, and data of the whole area of the original is temporarily stored into a frame buffer 115. At this time, simultaneously with the averaging process, the R, G, and B output signals are sub-sampled at every interval of M pixels (M=about 8 to 32 pixels), thereby reducing the data amount. The averaging and sub-sampling processes are executed in at least one of the main scanning direction and the sub scanning direction. The data which has temporarily stored in the frame buffer 115 is subjected to a process as will be explained hereinbelow by a CPU 116, thereby discriminating the presence or absence of the bank note or the like. Such a discrimination is executed with respect to a plurality of areas in the original. If it is determined that the image is or includes a bank note, the CPU 116 sends an address of an image corresponding to the relevant area to a gate signal generation circuit 117. The generation circuit 117 sends a gate signal to the selector 118. The selector 118 supplies the image signals C, M, Y, and K from the UCR circuit 112 for the area in which the bank note or the like doesn't exist and also supplies a dummy signal (fixed value signal) for the area in which the bank note or the like exists. For instance, 0 or FF can be used as a dummy signal. An output signal of the selector 118 is again converted into the analog signal by a D/A converter 119. The analog signal is compared with an output signal of a triangle wave generation circuit 120 synchronized with an image clock by a comparator 121. An output signal of the comparator 121 is transmitted through a laser driver 122 and pulse width modulates a semiconductor laser 123. A semiconductor laser output is collimated by an appropriate optical system and scans on a photo sensitive drum 125 by a polygonal mirror 124 which rotates at a high speed, thereby writing a latent image. The latent image formed on the drum 125 is subjected to a developing process, a copy transferring process, and a fixing process (not shown) and a visible image is area sequentially formed onto a paper in accordance with the order of C, M, Y, and K and the copying operation is completed.

In the above operation, a process of data storing in the frame buffer and a discriminating process can be executed upon prescanning and a gate signal as a result of the discrimination can be also generated upon main scanning. On the other hand, it is also possible to construct the apparatus in a manner such that the data is fetched at the first time (scan of Y) of the area sequential scan of Y, M, C, and K and the discriminating processes are executed at the second and third times (scans of M and C) of the scan and the gate signal is generated only for the final area (at the fourth time) (scan of K).

Figure 2:
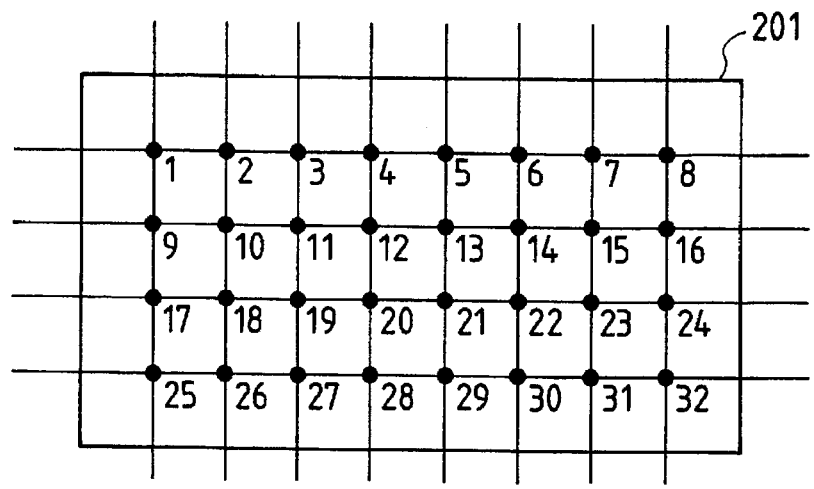
FIG. 2 is a diagram for explaining the sampling of a target color.
Figure 3:
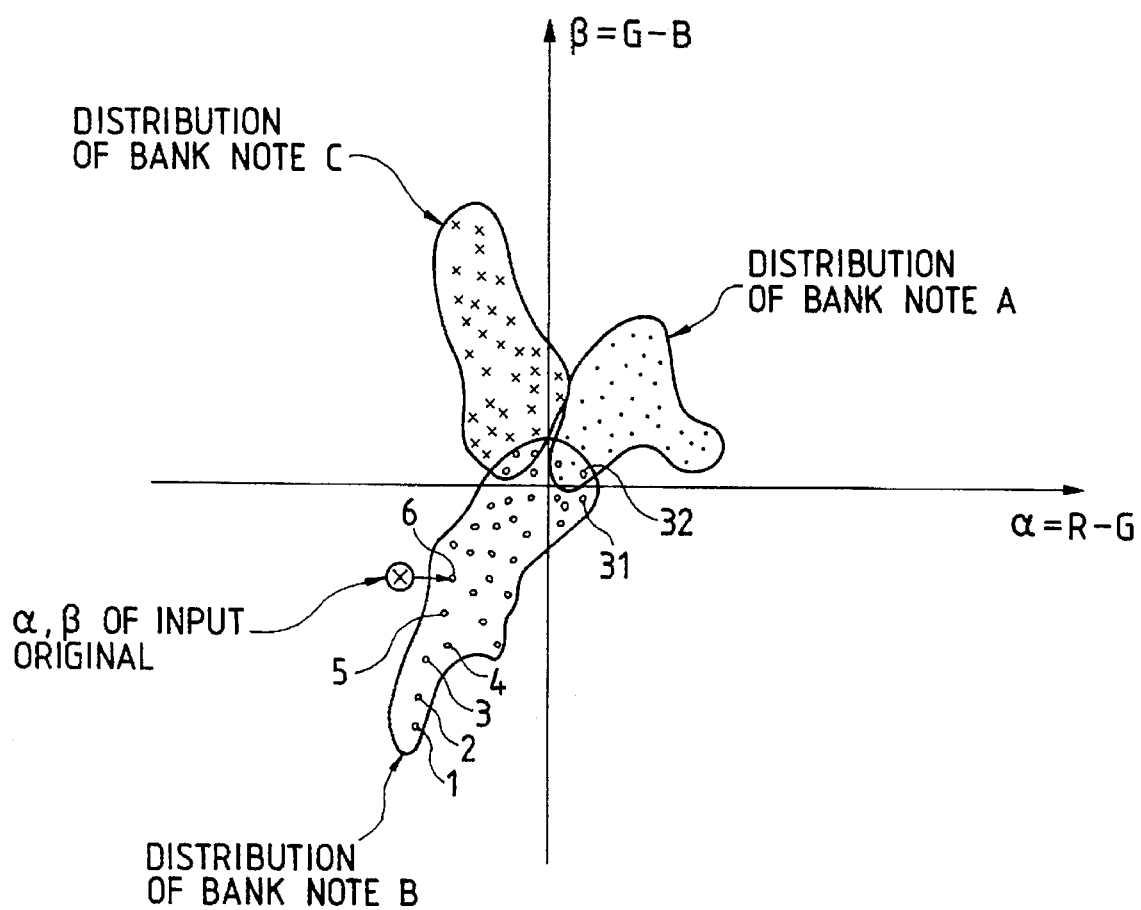
FIG. 3 is a diagram showing an example of a distribution of a target color.
Figure 4:
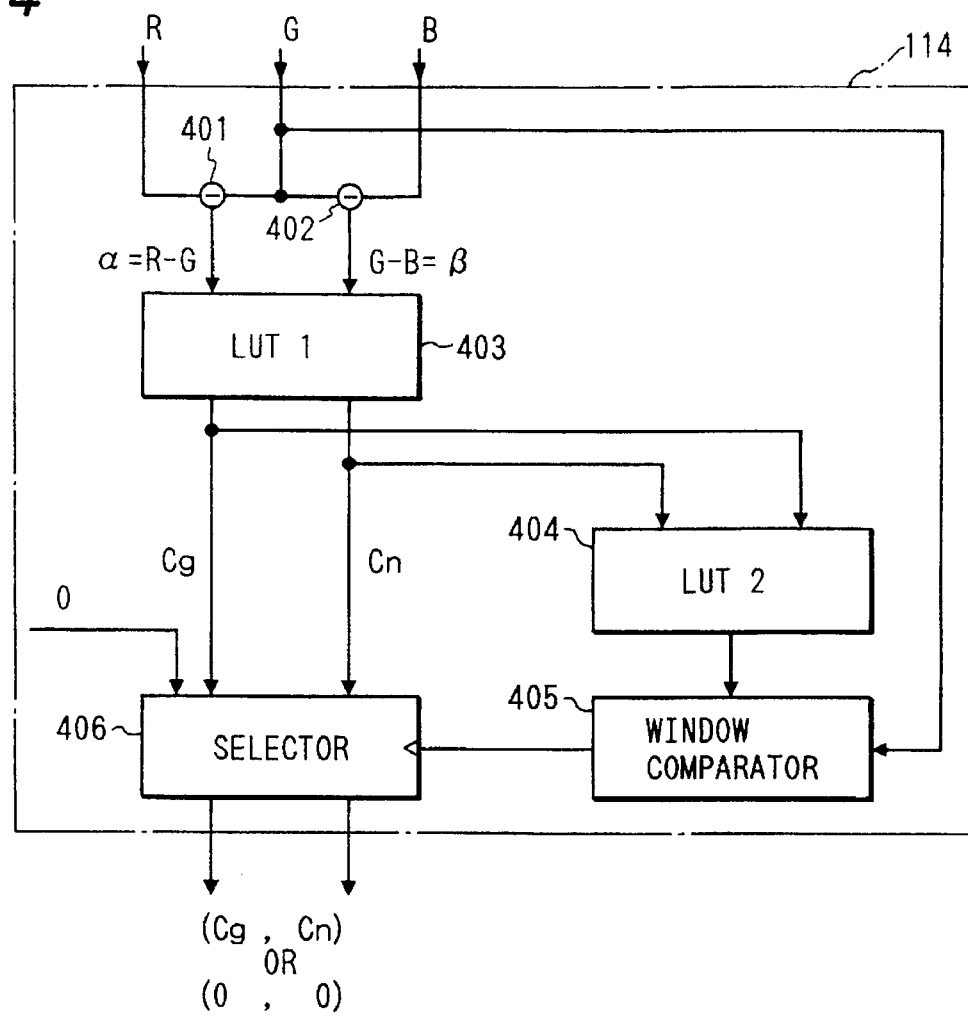
FIG. 4 is a detailed diagram of a color judgment lookup table.

The discriminating processes by the LUT 114 and CPU 116 will now be described. The case where three kinds of bank notes A, B, and C are used as objects to be discriminated will now be considered. First, standard samples are prepared with respect to the bank notes A, B, and C and are sampled at 32 points as shown in FIG. 2, thereby obtaining R, G, and B values corresponding to each point. The sampling points corresponding to the bank note A are set to $R_{a1}$ to $R_{a32}$, $G_{a1}$ to $G_{a32}$, and $B_{a1}$ to $B_{a32}$. The sampling points corresponding to the bank note B are set to $R_{b1}$ to $R_{b32}$, $G_{b1}$ to $G_{b32}$, and $B_{b1}$ to $B^{b32}$. The sampling points corresponding to the bank note C are set to $R_{c1}$ to $R_{c32}$, $G_{c1}$ to $G_{c32}$, and $B_{c1}$ to $B_{c32}$. Color difference signals $\alpha$ (=R−G) and $\beta$ (=G−B) are subsequently obtained. Distributions of $\alpha$ and $\beta$ are as shown in, e.g., FIG. 3. Each of the bank notes A, B, and C has a group of 32 points. The LUT 114 generates a code $C_g$ indicating to which one of the groups of the bank notes A, B and C the R, G, and B values of the original image are closest. The LUT 114 also generates a code $C_n$ indicating to which one of 1 to 32 in the closest group the R, G, and B values are closest. For instance, in the case of FIG. 3, $C_g$=2 (B group) and $C_n$=6 are generated. The details have a construction as shown in FIG. 4.

The code $C_g$ is set to 1 in the case where the R, G, and B values are close to A; 2 in the case where they are close to B; and 3 in the case where they are close to C. Reference numerals 401 and 402 denote subtracters to calculate $\alpha$ (=R−G) and $\beta$ (=G−B) from the R, G, and B values. Reference numeral 403 denotes an LUT for generating the code signal $C_g$ (1, 2, or 3 is generated in correspondence to A, B, or C) indicating to which one of the groups A, B, or C in FIG. 3 the values of $\alpha$ and $\beta$ are closest and the code $C_n$ (an integer from 1 to 32 is generated) indicating to which one of the 32 points of A, B, or C the values of $\alpha$ and $\alpha$ are closest. When the above shortest distance is equal to or larger than a predetermined value (that is, in the case of none of A, B, and C), $C_g$=0 and $C_n$=0 are generated. Since the brightness information is lost in the case of the classification due to only the color difference signals $\alpha$ and $\beta$, an LUT 404 and a window comparator 405 are used in consideration of such a case. Reference numeral 404 denotes the second LUT to store a standard value of G corresponding to $C_g$ and $C_n$. For instance, when $C_g$=2 and $C_n$=6, a value $G_{b6}$ of G for the standard sample is generated. The value $G_{b6}$ and the value of G of the original image are supplied to the window comparator 405, thereby discriminating whether the following condition is satisfied or not:

$$G_{b6}-d \leq G \leq G_{b6}+d \tag{1}$$

where d denotes a predetermined constant.

The result of the discrimination is supplied to a selector 406. When the condition (1) is satisfied, $C_g$ and $C_n$ are directly generated. When the condition (1) is not satisfied, $C_g$ and $C_n$ are reset to 0 and are output with that value. The original image is converted into the code information or code data $C_g$ and $C_n$ by the above processes and they are stored into the frame buffer 115.

After the values of $C_g$ and $C_n$ are written into the frame buffer 115 with respect to the whole area of the original, the CPU 116 then reads out those data from the buffer 115 and discriminates the presence or absence of the bank note. The above discriminating process will now be described.

Figure 5:
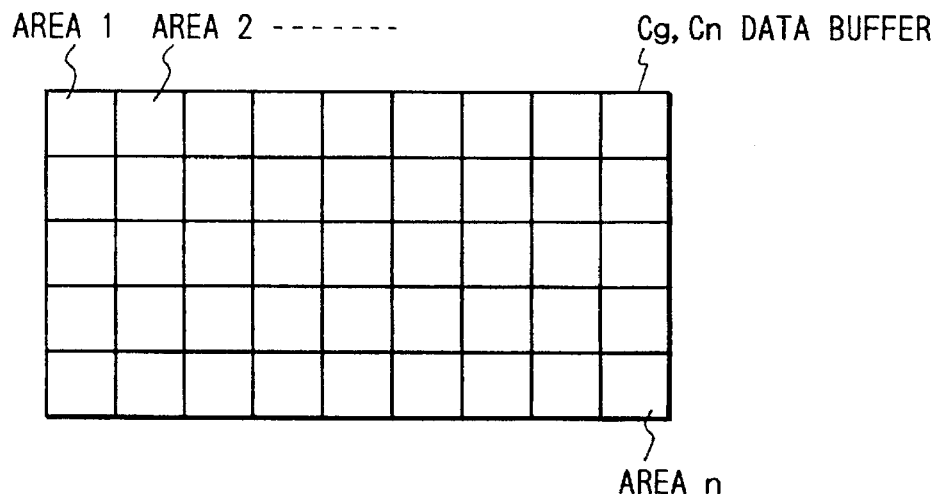
FIG. 5 is a diagram for explaining a judgment area.

The content in the frame buffer 115 is first divided into a plurality of areas as shown in FIG. 5. The whole area of the original image 102 is sub-sampled every M pixels and converted into the codes $C_g$ and $C_n$ and the resultant data is stored in the frame buffer 115. Therefore, each area is obtained by dividing the original into a plurality of windows each having a predetermined size.

Histograms of $C_g$ and $C_n$ are subsequently formed in each area. The histogram of $C_g$ is as shown in, e.g., FIG. 6-1A or 6-2A. It is now assumed that FIGS. 6-1A to 6-1D show histograms of the area 1. FIGS. 6-2A to 6-2D show histograms of the area 2. $C_g=0$ is excluded because it is not close to any of A, B, and C. Histograms of $C_n$ with respect to the cases of $C_g=1, 2, 3$ are as shown in FIGS. 6-1B, 6-1C, 6-1D, 6-2B, 6-2C, and 6-2D. In the above drawings, each of FIGS. 6-1A and 6-2A shows the number of pixels having a color close to either one of A, B, and C which exist in the target area. Each of FIGS. 6-1B, 6-2B, 6-1C, 6-2C, 6-1D, and 6-2D shows to which one of the colors 1 to 32 in each group of A, B, and C the color is closest. Therefore, in the case where the bank note exists in the target area, the histogram of $C_g$ is concentrated to one of 1, 2, and 3. On the contrary, it is possible to consider such that the histogram of $C_n$ is equivalently distributed to 1 to 32 (this is because since 1 to 32 correspond to the colors of respective positions of the bank note as shown in FIG. 2, if the bank note exists, those colors ought to be equivalently included). In the examples of FIGS. 6-1A to 6-2D, (1) in the area 1, although the histogram is concentrated to $C_g=2$, the histogram of $C_n$ when $C_g=2$ is concentrated at one point and it is considered such that a number of similar colors merely happened to be included. On the other hand, (2) in the area 2, the histogram is concentrated to $C_g=3$ and the histogram of $C_n$ corresponding to $C_g=3$ is also equivalently distributed to 1 to 32, so that it is possible to determine that a bank note is present.

It is, therefore, sufficient to calculate the following parameters from the histograms of $C_g$ and $C_n$ and to execute the judgment:

$$\begin{cases} \text{The numbers of pixels when } C_g = 1, 2, 3 = \\ N_g(1), N_g(2), N_g(3) \\ \text{The numbers of pixels when } C_g = 1 \text{ and } C_n = 1, 2, \ldots, 32 = \\ N_n^A(1), N_n^A(2), \ldots, N_n^A(32) \\ \text{The numbers of pixels when } C_g = 2 \text{ and } C_n = 1, 2, \ldots, 32 = \\ N_n^B(1), N_n^B(2), \ldots, N_n^B(32) \\ \text{The numbers of pixels when } C_g = 3 \text{ and } C_n = 1, 2, \ldots, 32 = \\ N_n^C(1), N_n^C(2), \ldots, N_n^C(32) \end{cases}$$

Further, it is assumed that $N_n(1)$ to $N_n(32)$ have been rearranged in accordance with the order from the largest count value. The parameters are subsequently calculated as follows:

$$\sigma(1) = \sum_{k=1}^{32} k^2 \times N_n^A(k)$$

$$\sigma(2) = \sum_{k=1}^{32} k^2 \times N_n^B(k)$$

$$\sigma(3) = \sum_{k=1}^{32} k^2 \times N_n^C(k)$$

where, $N_g(1), N_g(2), N_g(3)$: degrees in which the pixels of the colors close to the groups A, B, and C are included $\sigma(1), \sigma(2), \sigma(3)$: degrees of distributions of 1 to 32 in the groups A, B, and C From the above description, when the following conditions are satisfied, it is determined that a bank note is present:

$$\begin{cases} \text{When } k \text{ is equal to one of the value of 1, 2, and 3,} \\ N_g(k) \geq th_1 \text{ and} \\ \sigma(k) \geq th_2 \\ \text{Where } th_1 \text{ and } th_2 \text{ are predetermined constants.} \end{cases}$$

In the case where a bank note is present, as mentioned above, the gate signal is generated from the gate signal generation circuit 117 and the image of the relevant area is erased.

Figure 7A:
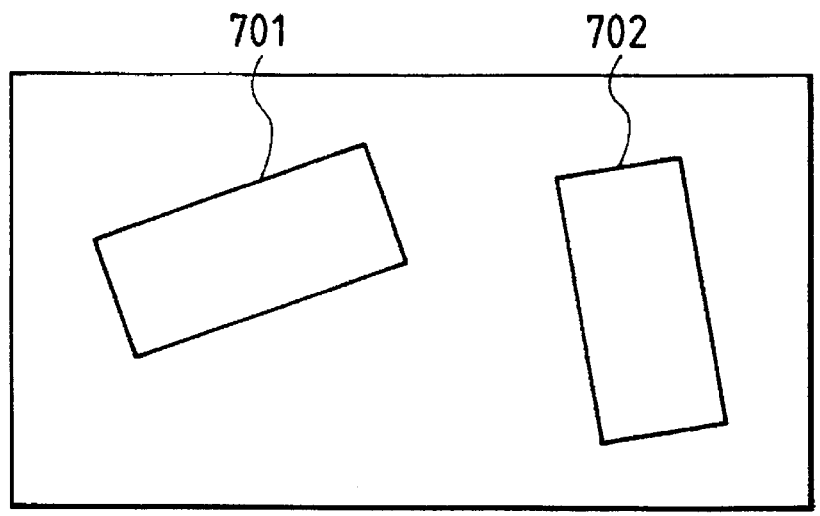
FIGS. 7A and 7B are diagrams showing examples of results of processes.
Figure 7B:
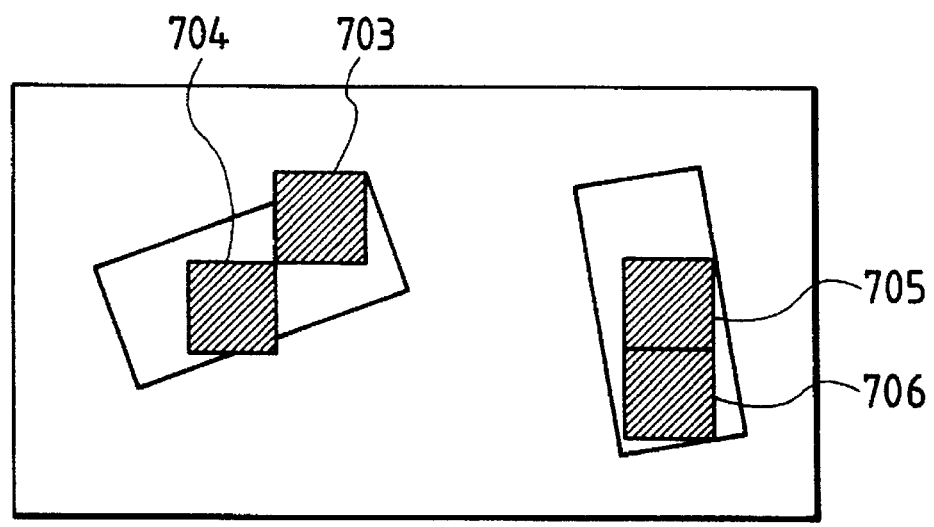

FIGS. 7A and 7B show the results of the processes which have been executed as mentioned above. FIG. 7A shows an original image in the case where bank notes are put at positions 701 and 702. FIG. 7B shows a copy image which is generated. The results of the judgment indicate the existence of the bank notes at positions 703, 704, 705, and 706 and the gate signal is generated so as to paint the images in the relevant areas in black (hatched portions).

<Second embodiment>

Figure 8B:
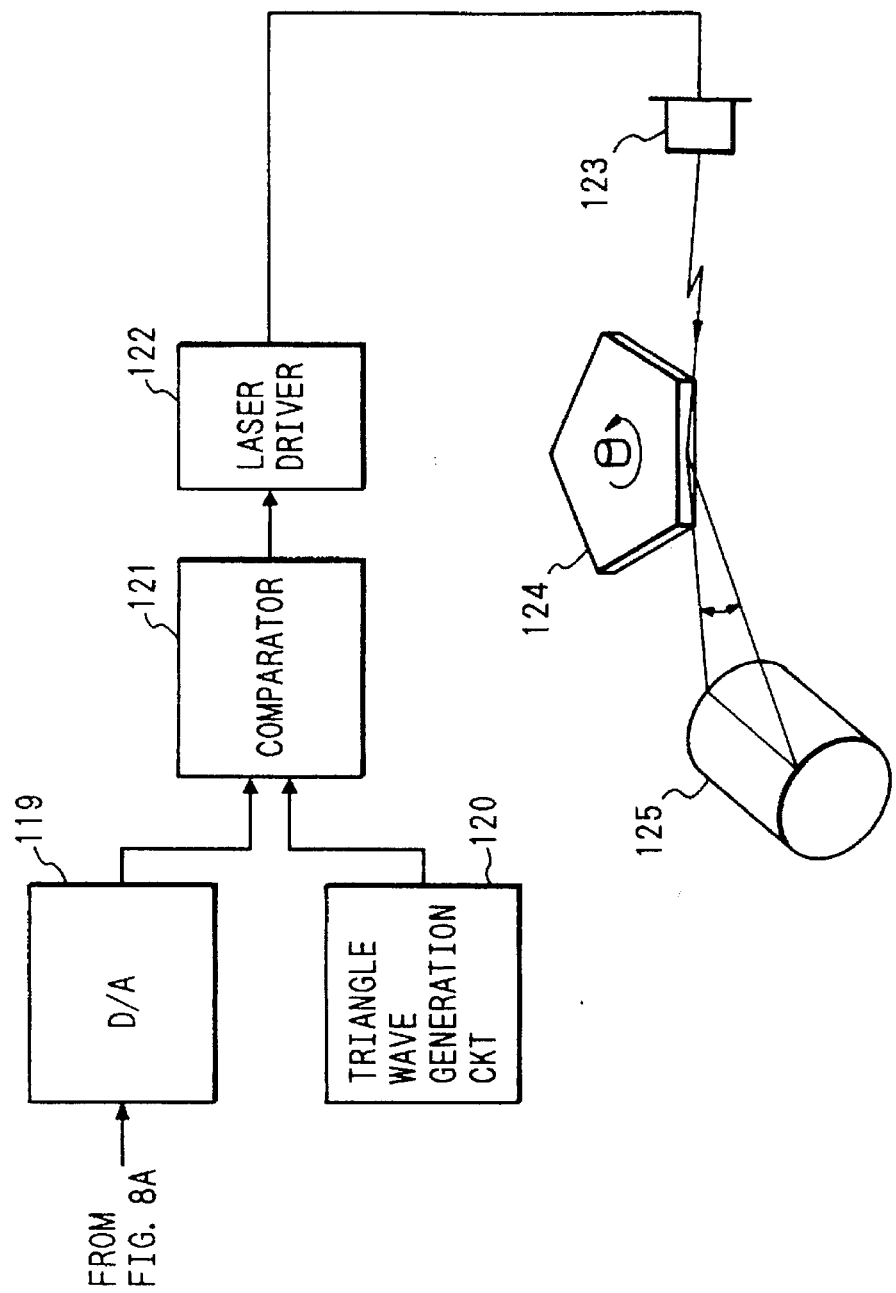
FIG. 8, consisting of FIGS. 8A and 8B is a block diagram showing the second embodiment.

FIG. 8A and 8B are block diagrams of the second embodiment. The descriptions about the same portions as those in FIG. 1 are omitted here. The output of the UCR circuit 112 is supplied to a smoothing circuit 801 and a line buffer 802. Outputs of the smoothing circuit 801 and the line buffer 802 are supplied to the selector 118 and are switched in accordance with the gate signal generated from the gate signal generation circuit 117 as a result of the judgment. In this case, in a area where it has been determined that the bank note exists, a blurred image which has been subjected to a smoothing process is generated and the object to copy the specific image is not accomplished yet.

Figure 9:
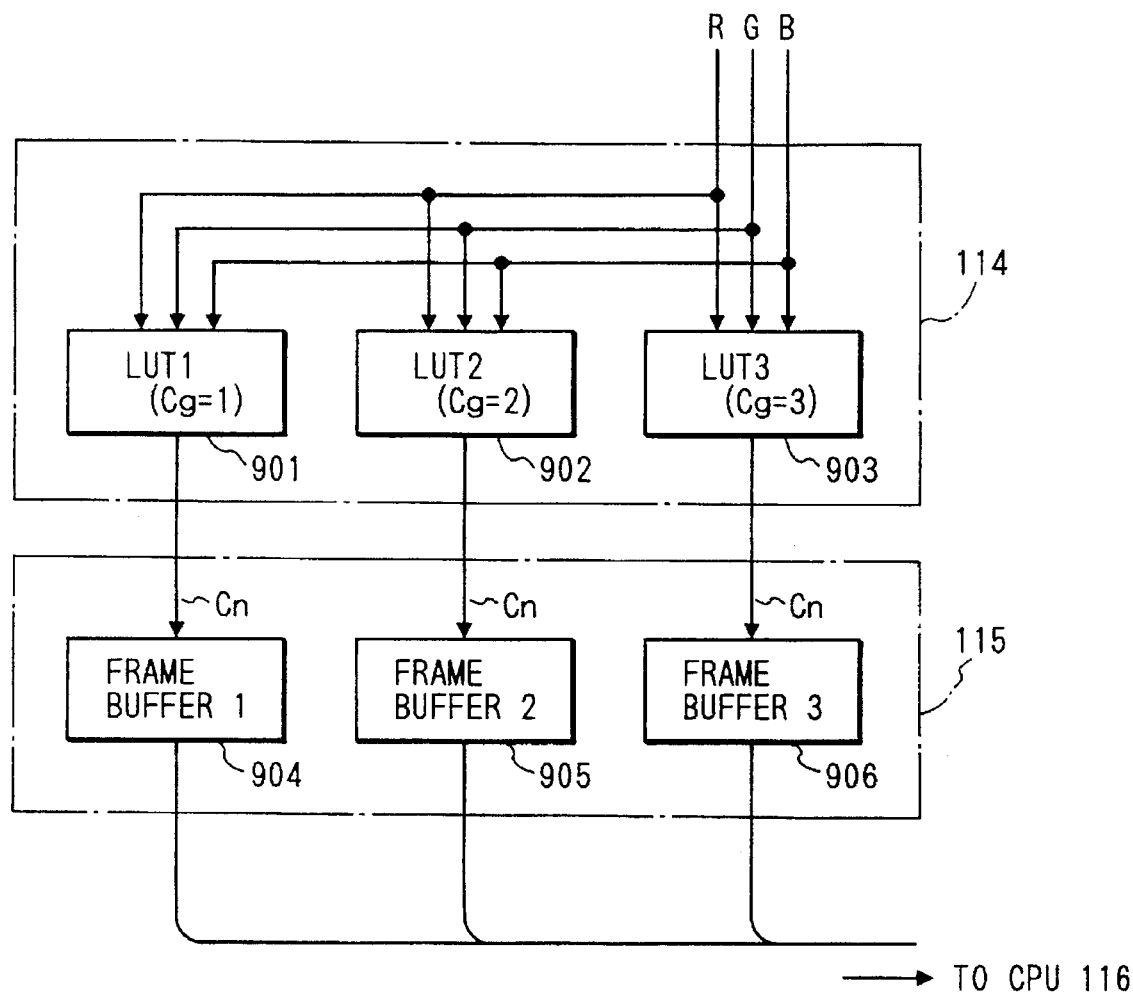
FIG. 9 is a diagram showing another embodiment of a color judgment lookup table.

FIG. 9 shows another example of a construction of the LUT 114. Three LUTs 901, 902, and 903 each of which receives the R, G, and B signals are provided in correspondence to $C_g=1, 2,$ and 3. Each of the LUTs independently generates the $C_n$ signal. Three frame buffers 904, 905, and 906 are also independently provided. The CPU 116 sequentially refers to the contents in the frame buffers 904 to 906 and independently executes the judging processes in a manner similar to those in the embodiment, thereby judging whether the result of the discrimination indicative of the presence of the bank note is derived for either one of $C_g=1, 2,$ and 3 or not. If the R, G, and B signals each having about four to five upper bits among eight bits of each of the R, G, and B output signals of the A/D converter 107 are supplied to each of the LUTs 901 to 903, the capacities of those LUTs can be set to small values.

According to the above embodiment of the invention, forgery can be prevented by a relatively simple construction.

Since the judging processes are executed on the basis of only the colors of the original, stable judgment results can be obtained irrespective of the positions and angles at which the bank notes or the like are put. Further, even if a plurality of objects to be judged are set or an object is changed, it is also possible to easily cope with such a case by merely changing the lookup tables.

In the above embodiment, the R, G, and B signals have been used as input signals. However, it is also possible to use input signals such as (Y, M, C), (L*, a*, b*), (Y, I, Q), (Y, $C_r$, $C_b$), or the like. On the other hand, although the color difference signals R-G and G-B have been used to judge the color, for instance, the signals can be also converted into signals such as (Y, I, Q), (L*, a*, b*), (L, U, V), (H, L, S), or the like. Code information (the code data) can be also formed by a three-dimensional distribution by including not only the color but also the brightness. In the case where the existence of the specific original has been determined, the processing which is executed is not limited to the painting process or smoothing process but it is sufficient to perform such other processing as a stop of the copying operation which is different from the normal processing for the ordinary original.

As mentioned above, according to the invention, a color image processing apparatus which can accurately discriminate a specific original can be provided.

<Third embodiment>

Figure 10:
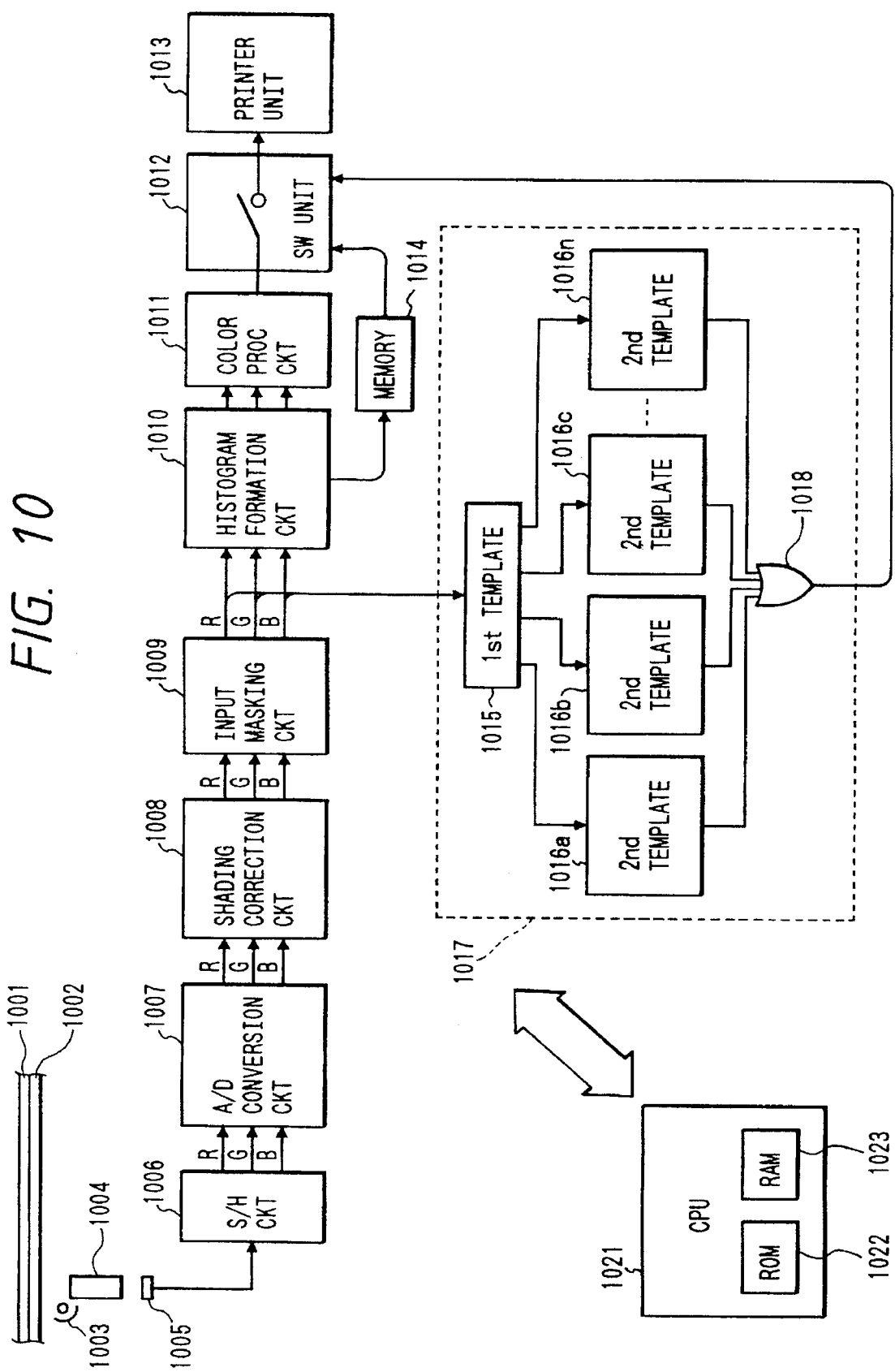
FIG. 10 is a block diagram showing the third embodiment of a copying apparatus in which an image reading apparatus according to the invention is installed.

FIG. 10 is a block diagram showing the third embodiment of a copying apparatus in which an image reading apparatus according to the invention has been installed.

In the copying apparatus shown in FIG. 10, an original 1001 put on an original base glass 1002 is illuminated by an original illuminating halogen lamp 1003 upon prescanning and main scanning and an image is formed onto a CCD line sensor 1005 by a rod lens array 1004. Color separation filters of R, G, and B are dot-sequentially coated onto the CCD line sensor 1005. The sensor 1005 generates color separation signals of the original every pixel and every line in the order of R, G, B, R, G, B, . . .

Reference numeral 1006 denotes a sample and hold circuit (hereinafter, referred to as an S/H circuit). The S/H circuit 1006 samples and holds an output signal of the CCD line sensor 1005 every pixel. An analog/digital converter (hereinafter, referred to as an A/D converter) 1007 converts analog signals which are generated from the S/H circuit 1006 into digital signals. A shading correction circuit 1008 corrects an output fluctuation due to a variation is sensitivities among the pixels of the CCD line sensor 1005. An input masking circuit 1009 masking-processes R, G, and B signals which are supplied from the shading correction circuit 1008 in accordance with characteristics of the CCD. Output signals of the input masking circuit 1009 are sent to a histogram formation circuit 1010 and to a template unit 1017, which will be explained hereinlater.

The histogram formation circuit 1010 forms histograms from the R, G, and B signals sent from the input masking circuit 1009 and stores them into a memory 1014 at the post stage. The template unit 1017 has a first template 1015 and second templates 1016a to 1016n to collate with the image data of the original which has been read. Reference numeral 1015 denotes the memory (first template) to store pattern information of a plurality of specific originals such as bank notes of, for instance, n countries. In accordance with the general pattern information about the color, shape, and the like of the bank note of each country which has been stored, a check is made to see if there is a possibility that the input image corresponds to one of them or not. Reference numerals 1016a to 1016n denote memories (2nd templates) to store detailed information such as pattern, color, and the like of the corresponding bank notes every pattern information stored in the first template. A further detailed judgment is executed for the input image which has been judged by the first template.

Reference numeral 1018 denotes an OR circuit. When at least one of outputs of the second templates 1016a to 1016n indicates a result of the judgment of the presence of the bank note, such a judgment signal is sent to a switch unit 1012, thereby turning off the switch unit 1012. Thus, the normal image data is not sent to the printer unit 1013 and the forgery of the bank note can be prevented.

A color processing circuit 1011 executes color processes such as logarithm conversion, masking, UCR (undercolor removal), and the like. The switch unit 1012 controls the operation of a printer unit 1013 at the post stage. The printer unit 1013 is constructed by, for example, a laser beam printer and is set into a printing mode when the switch unit 1012 is set to ON. The memory 1014 stores the histograms formed by the histogram formation circuit 1010 upon prescanning. Reference numeral 1021 denotes a CPU to control the whole apparatus; 1022 indicates a ROM in which control programs (programs according to a flowchart of FIG. 11 and the like) to operate the CPU 1021 have been stored; and 1023 a RAM which is used as a work area of various programs.

The operation according to the above construction will now be described.

Figure 11:
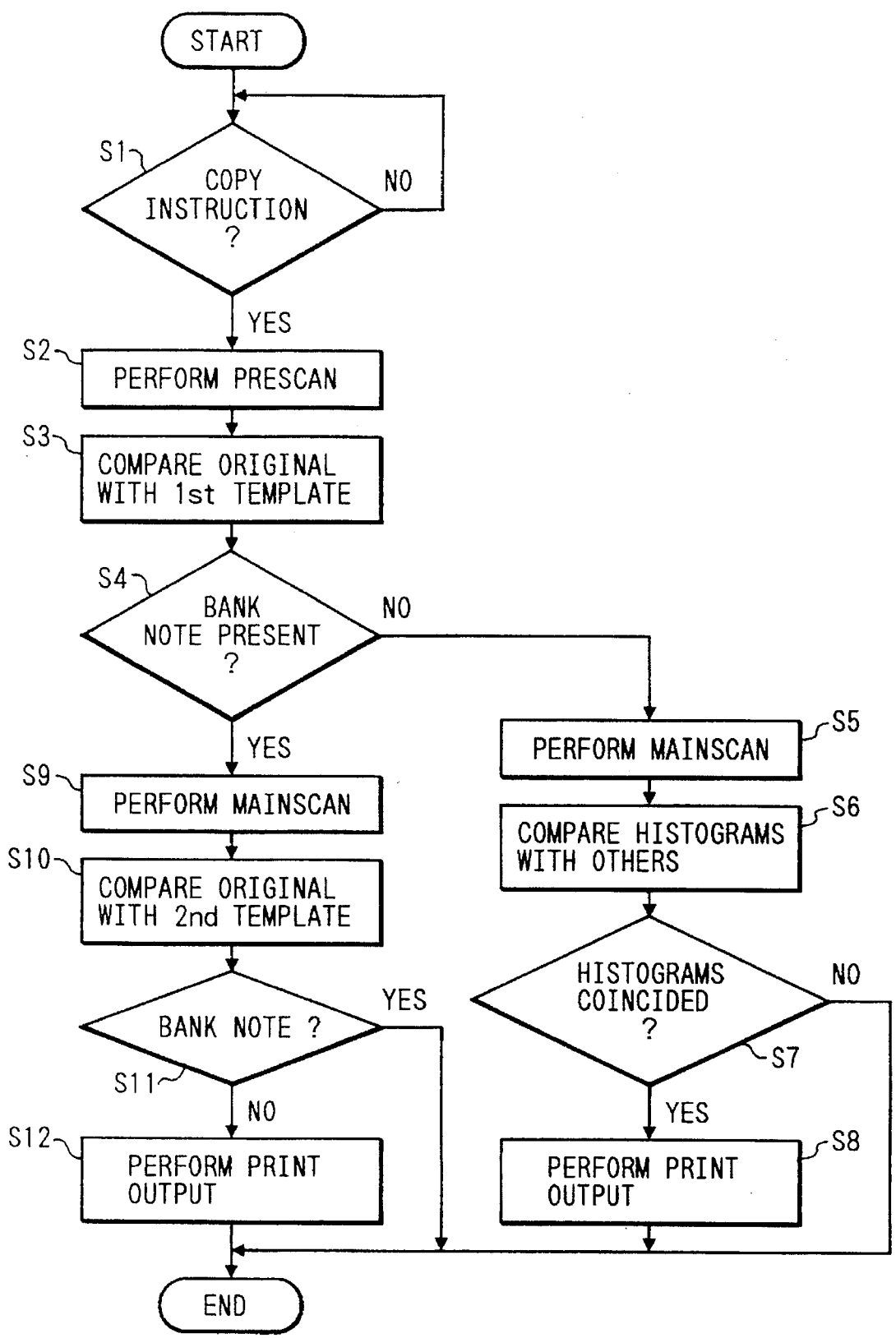
FIG. 11 is a flowchart for explaining a copying operation of a CPU 1021 according to this embodiment.

FIG. 11 is a flowchart for explaining the control of the copying operation which is executed by this CPU 1021 of the embodiment.

First, the operation in the prescanning mode will now be described. In the prescanning mode, the original size, original concentration, and the like are ordinarily detected. In this embodiment, however, the following processes are also executed. In accordance with a copy instruction by an operation unit (not shown) (step S1), the original 1001 put on the original base glass 1002 is illuminated by the halogen lamp 1003 and an image is formed onto the CCD line sensor 1005 (step S2). The signal converted by the sensor 1005 is sent to the S/H circuit 1006 and is sampled and held every pixel. After that, the signals are converted into the digital signals by the A/D converter 1007. Subsequently, the digital signals of R, G, and B are transmitted through the shading correction circuit 1008 and the input masking circuit 1009 and are subjected to the shading correction and the masking process. The output signals R, G, and B of the input masking circuit 1009 are supplied to the histogram formation circuit 1010 and the template unit 1017. The histogram data formed by the histogram formation unit 1010 is temporarily stored into the memory 1014. On the other hand, the signals sent to the template unit 1017 are collated with the contents in the first template 1015, thereby judging the presence or absence of the bank note (step S3). The control regarding such a judgment is executed by the CPU 1021. Thus, if it is determined that there is no possibility that the input image data corresponds to all of the bank notes registered in the second templates 1016a to 1016n, a switch ON signal is transmitted to the switch unit 1012 and the switch unit 1012 is turned ON. Thus, the ordinary copying operation is performed. On the contrary, if it is decided that there is a possibility that the input image data corresponds to any of the bank notes registered in the second templates 1016a to 1016n, the detailed judgment using the second templates is executed in the next main scan.

The prescan operation is finished by the above operation and the main scan to execute the ordinary copying operation is subsequently performed (step S5). The main scan is executed a total of four times, with respect to Y, M, C, and K, in a manner similar to the first embodiment. The processes similar to those in the prescan are executed up to the input masking circuit 1009. The signals which are generated from the input masking circuit 1009 are sent to the histogram formation circuit 1010 and the template unit 1017. Histograms are formed by the histogram formation circuit 1010 on the basis of the signals transmitted and the foregoing predetermined color processes are executed by the color processing circuit 1011 at the post stage. After that, when the switch unit 1012 is set to ON, the color processed signals are sent to the printer unit 1013 through the switch unit 1012 and generated as a hard copy. The ON/OFF operations of the switch unit 1012 in the main scan will now be described. The histograms formed by the histogram formation circuit 1010 are sent to the memory 1014 and compared with the histograms stored upon prescanning by the CPU 1021 (step S6). The result of the comparison is sent to the switch unit 1012 and when both of the histograms coincide (step S7), the switch unit 1012 is held to the ON state and the ordinary copying operation is performed (step S8). If the histograms differ (step S7), this means that the original upon prescanning differs from the original upon main scanning and there is also a possibility that a bank note has been put on the original base glass after completion of the prescan. Therefore, the switch unit 1012 is set to OFF and the copying operation is stopped.

By the above processing flow, it is possible to check to see if the original upon prescanning differs from the original put on the original base glass 1002 upon main scanning or not. If the original has been exchanged, the copying operation can be inhibited.

On the other hand, the signal sent to the template unit 1017 in the main scan in the case where it is determined that there is a possibility of the existence of the bank note upon prescanning is supplied through the first template to the second templates 1016 and the pattern information, color information, and the like are respectively collated (step S10) after completion of the main scan (step S9) since the kinds of specific originals, that is, the countries and kinds of the bank notes had previously been judged in the first template 1015 upon prescanning. Thus, if it is determined that the input image data doesn't relate to the bank note, the switch ON signal is sent to the switch unit 1012, the switch unit 1012 is held to the ON state, and the ordinary copying operation is started (step S12). On the contrary, if the existence of the bank note is determined, the switch OFF signal is sent to the switch unit 1012, the switch unit 1012 is turned OFF, and the copying operation is stopped.

As described above, according to the embodiment, for instance, the two kinds of comparing processes are executed between the first template having the color distribution data about a plurality of bank notes and the detailed second templates having the data of various kinds of bank notes. Therefore, it is possible to prevent the time of the copying operation becoming longer than the ordinary copying time due to the time which is required to judge the bank notes.

On the other hand, since the similarity (or identity) of the original in the prescan and the original in the main scan is also discriminated, it is possible to prevent forgery of a bank note by means of an exchange or like of the original after completion of the prescan.

In the above third embodiment, the bank note has been mentioned as an example of an object which is used to prevent the forgery. However, the invention is not limited to such example but can be also applied to the cases of preventing the forgery of stocks and bonds, various contract documents, and the like.

Various kinds of printers such as laser beam printer of the electrophotographic type, thermal copy transfer printer, dot printer, ink jet printer, etc. can be also used as a printer unit 1013.

The algorithm in the first embodiment can be also used as an algorithm for the judgments which are executed in the above templates. Each of the above templates is constructed by an RAM, a ROM, or the like. Therefore, by rewriting the content in the RAM or by exchanging the ROM, it is also possible to cope with the case where an object whose copying operation should be inhibited has been changed (for instance, the case where the pattern, color, or the like of the bank note has been changed).

<Fourth embodiment>

Figure 12:
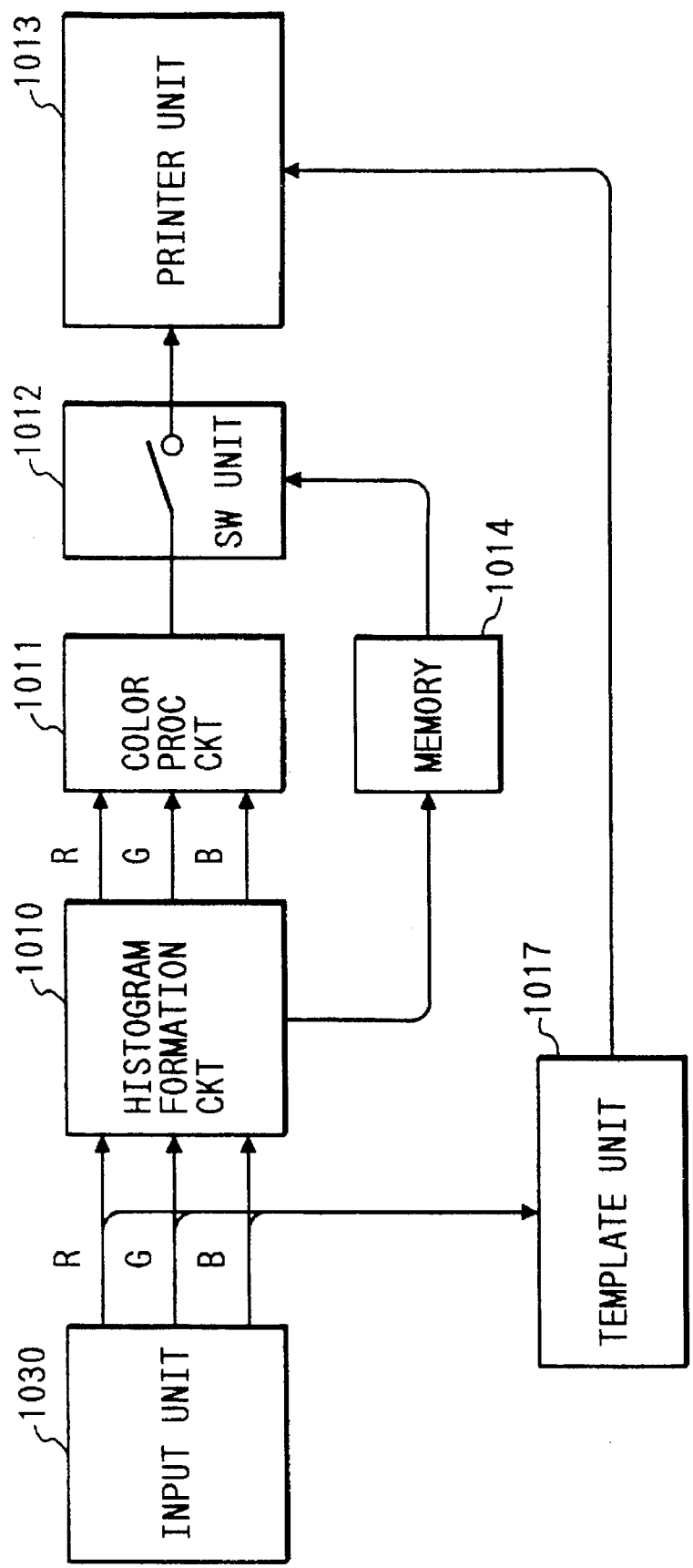
FIG. 12 is a block diagram showing the fourth embodiment as a main section of a copying apparatus in which the image reading apparatus according to the invention is installed.

FIG. 12 is a block diagram showing the fourth embodiment as a main section of a copying apparatus in which the image reading apparatus according to the invention has been installed. In the diagram, the component elements similar to those in FIG. 10 are designated by the same reference numerals. An input unit 1030 has a construction similar to the construction until the input masking circuit 1009 in FIG. 10. In the fourth embodiment, a print permission from the template unit 1017 is directly instructed to the printer unit 1013.

In the main scan, the output signals R, G, and B from the input unit 1030 are sent to the histogram formation circuit 1010 and the template unit 1017. The signals sent to the histogram formation circuit 1010 are transmitted along a path similar to that in the third embodiment and are transferred to the printer unit 1013 when the switch unit 1012 is set to ON.

The template unit 1017 has the first template 1015 (not shown) and the second templates 1016$a$ to 1016$n$ (not shown) similar to those in the third embodiment. The presence or absence of the bank notes in the original is judged by using those templates. At this time, if the absence of the bank notes is determined, a print permission signal having a function similar to that of the switch ON signal in the third embodiment is directly supplied to the printer unit 1013. On the contrary, if the existence of the bank note is decided, the data in the address in which the presence of the bank note in the original has been determined is sent to the printer unit 1013. Upon reception of the signal of such data, the printer unit 1013 paints out the portion indicated by the address data in black. In this case, the painting process can be easily executed if an AND circuit to calculate the AND with the image data in the address of an object to be painted in black is provided in the data input section in the printer unit 1013.

An effect similar to that in the third embodiment can be also obtained by the above construction.

<Fifth embodiment>

The fifth embodiment has a construction similar to that of the fourth embodiment mentioned above. The printer unit 1013 which has received the address data from the template unit 1017 generates an image which is made blurred to an extent such that it cannot be used as a bank note corresponding to the received address data. As such a method, a method of a mosaic processing or the like can be also used.

An effect similar to that in the first embodiment can be also derived by the above construction.

As described above, according to the invention, the copy of the original image which has been determined to be a specific original can be certainly inhibited.

Figure 13:
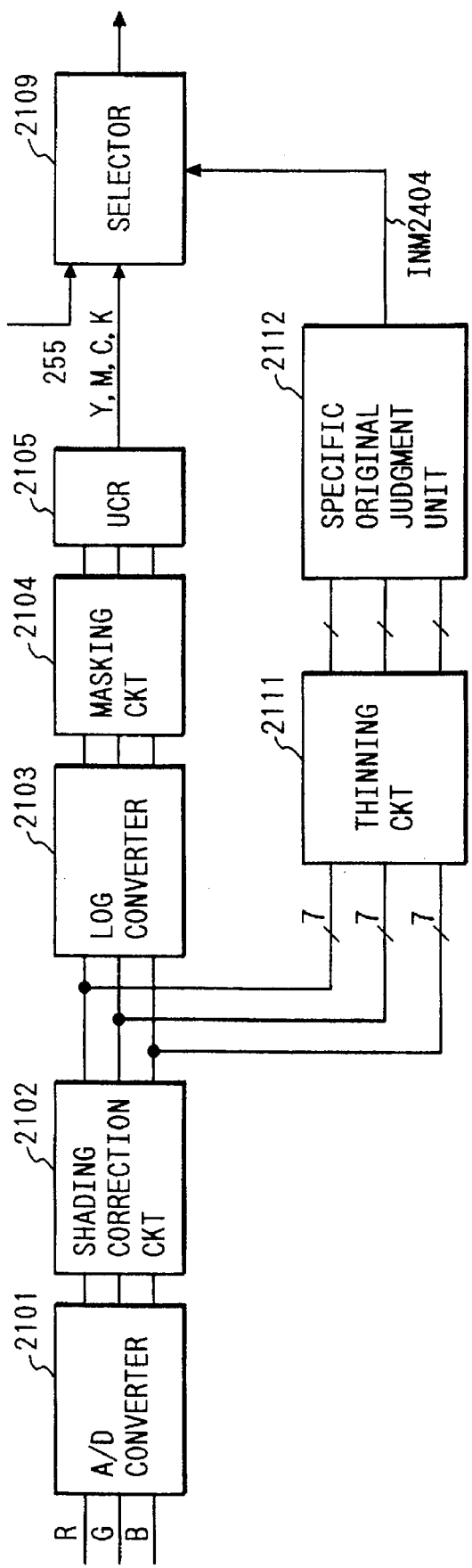
FIG. 13 is a block diagram showing an internal construction of an image scanner unit of a copying apparatus according to the invention.

FIG. 13 is a block diagram showing an internal construction of an image scanner unit of a copying apparatus according to the sixth embodiment of the invention. In the diagram, reference numeral 2101 denotes an A/D converter for converting analog signals of R, G, and B which are sent from image input means such as CCD line sensor, host computer, or the like (not shown) into digital signals. Reference numeral 2102 denotes a shading correction circuit for shading correcting the digital R, G, and B signals. Reference numeral 2103 denotes a logarithm (log) converter which is constructed by a lookup table ROM (or RAM) to convert the shading corrected R, G, and B signals (luminance signals) into the concentration signals; 2104 a masking circuit; and 2105 an UCR circuit. A masking process and an UCR (under color removal) process are executed to the concentration signals from the log converter 2103 by the masking circuit 2104 and the UCR circuit 2105.

Reference numeral 2111 denotes a thinning circuit for thinning out the corrected R, G, and B signals from the shading correction circuit 2102. A construction of the thinning circuit 2111 will be described hereinlater with reference to FIG. 14. Reference numeral 2112 denotes a specific original judgment unit to judge the presence or absence of a specific original on the basis of the thinned-out R, G, and B signals from the thinning circuit 2111. A construction of the specific original judgment unit 2112 will be described hereinlater with reference to FIG. 16.

FIG. 14 is a circuit diagram showing a construction of the thinning circuit 2111 according to the sixth embodiment. In the diagram, reference numerals 2201a, 2201b, and 2201c denote flip-flops which operate by the same clock CLK as that of the image signal; and 2202a, 2202b, and 2202c denote flip-flops which operate by a clock CLK' which is derived by frequency dividing the clock CLK into ¼. Waveforms of clocks CLK 2203 and clocks CLK' 2204 are also shown in FIG. 14. The thinning circuit 2111 operates so as to sample the time-sequential image data every predetermined n clocks.

A construction of the copying apparatus will now be described.

Figure 22:
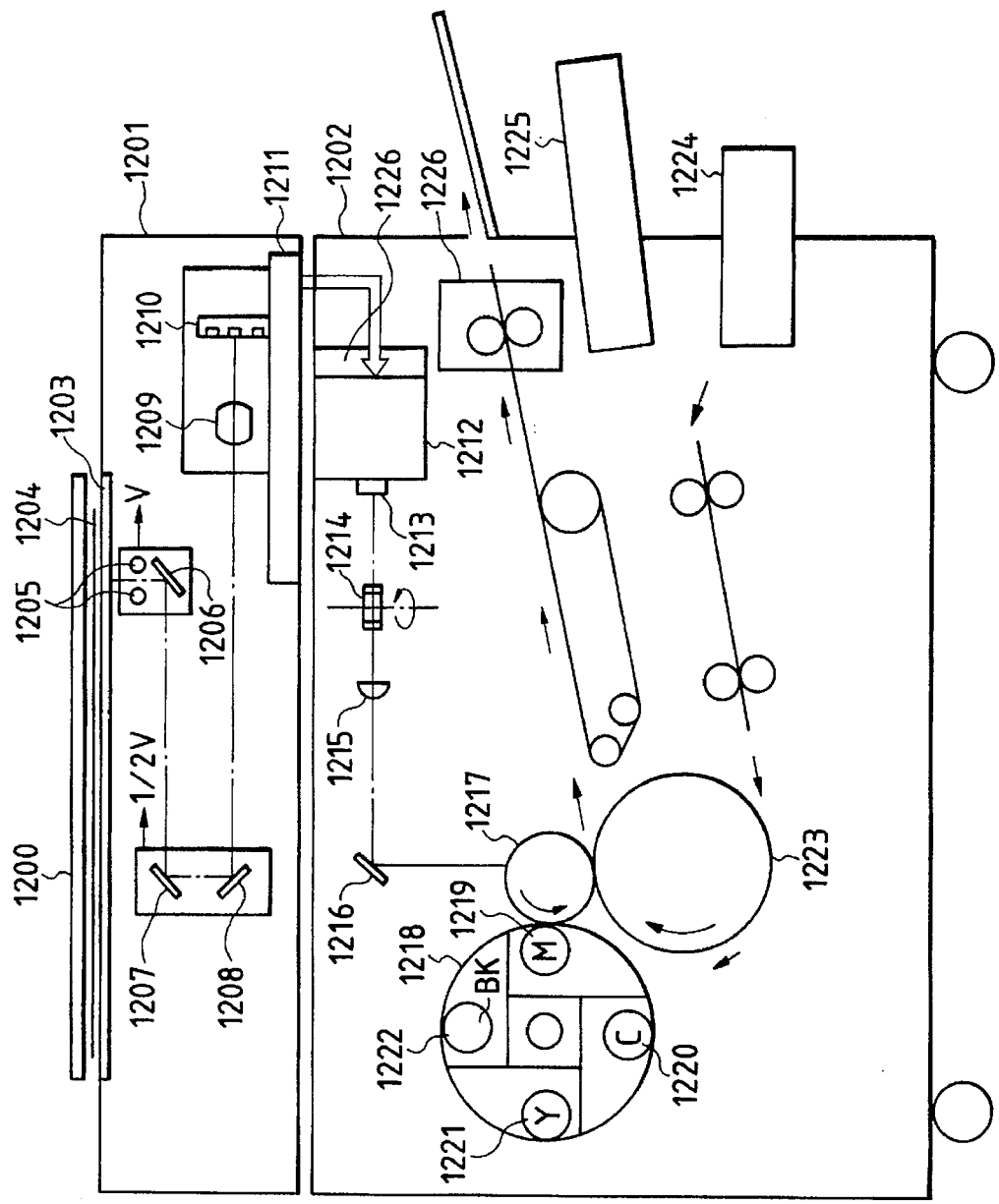
FIG. 22 is a side sectional view showing an internal construction of a copying apparatus of the sixth embodiment of the invention.

FIG. 22 is a side sectional view showing an internal construction of the copying apparatus of the sixth embodiment of the invention. In the diagram, reference numeral 1201 denotes an image scanner unit for reading an original and for executing a digital signal process; and 1202 a printer unit for printing and outputting an image corresponding to the original image which has been read by the image scanner unit 1201 onto paper in full color.

In the image scanner unit 1201, reference numeral 1200 denotes a mirror surface pressing plate. An original 1204 put on an original base glass (hereinafter, referred to as a platen) 1203 is illuminated by a lamp 1205. The reflected light is led to mirrors 1206, 1207, and 1208 and an image is formed through a lens 1209 onto a 3-line sensor (hereinafter, referred to as a CCD) 1210 which is constructed by arranging three R, G, and B line sensors in parallel. The image data is sent to a signal processing unit 1211 as full color information components of red (R), green (G), and blue (B). The lamp 1205 and the mirror 1206 are mechanically moved at a velocity v and the mirrors 1207 and 1208 are also mechanically moved at a velocity of v/2 in the direction (subscanning direction) perpendicular to the electrical scanning direction (main scanning direction) of the line sensor, thereby scanning the whole area of the original. The signal processing unit 1211 electrically processes the read image signal and separates into the components of magenta (M), cyan (C), yellow (Y), and black (Bk) and sends them to the printer unit 1202. One of the components of M, C, Y, and Bk is sent to the printer unit 1202 by a single scan of the original by the image scanner unit 1201. A single print is completed by a total of four scans of the original.

The image signal of M, C, Y, or Bk sent from the image scanner unit 1201 is supplied to a laser driver 1212. The laser driver 1212 modulates and drives a semiconductor laser 1213 in accordance with the image signal. A laser beam is reflected and transmitted by a polygonal mirror 1214, an f-θ lens 1215, and a mirror 1216 and scans on a photo sensitive drum 1217.

Reference numeral 1218 denotes a rotary developing device comprising: a magenta developing unit 1219, a cyan developing unit 1220, a yellow developing unit 1221, and a black developing unit 1222. The above four kinds of developing units are alternately come into contact with the photo sensitive drum 1217 and an electrostatic latent image formed on the drum 1217 is developed by toners of respective colors.

Reference numeral 1223 denotes a copy transfer drum. A paper which has been fed from a paper cassette 1224 or 1225 is wound around the copy transfer drum 1223 and the image developed on the photo-sensitive drum 1217 is copy transferred onto the paper.

After the images of four colors of M, C, Y, and Bk are sequentially copy transferred onto the paper, the paper passes through a fixing unit 1226 and is discharged out of the copying apparatus.

Figure 16A:
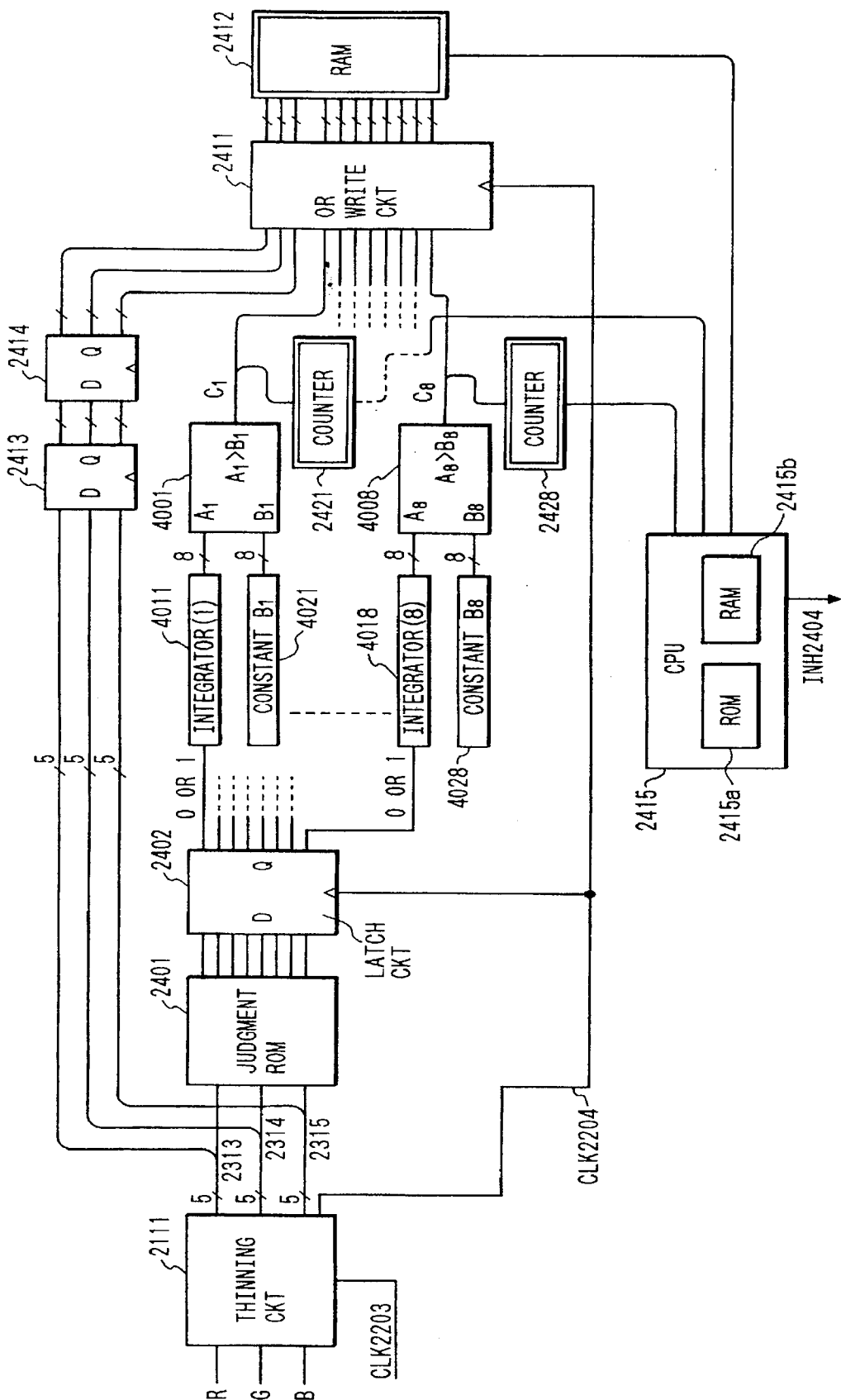
FIG. 16A is a block diagram showing a construction of a specific original judgment unit 2112 according to the sixth embodiment.
Figure 17:
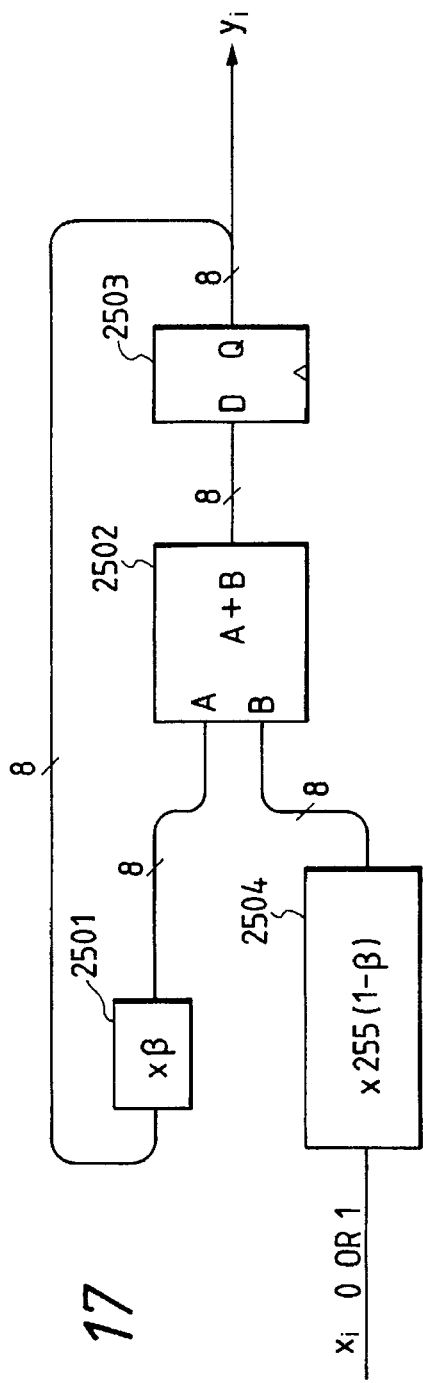
FIG. 17 is a block diagram showing a typical construction of integrators 4011 to 4018.
Figure 18A:
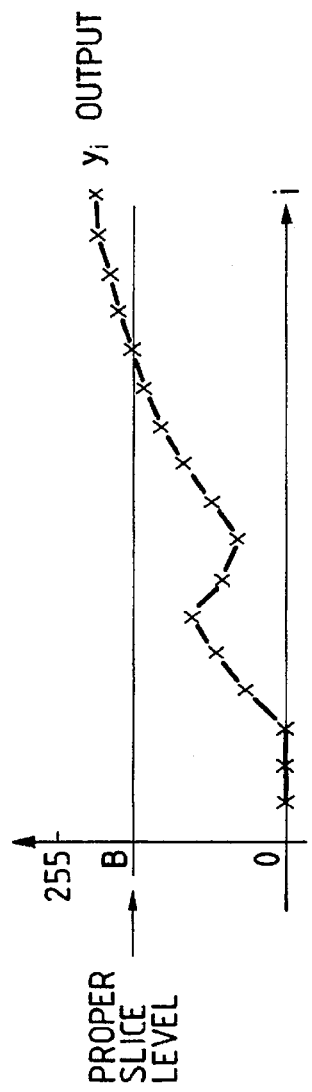
FIGS. 18A and 18B are diagrams for explaining integrating effects.
Figure 18B:
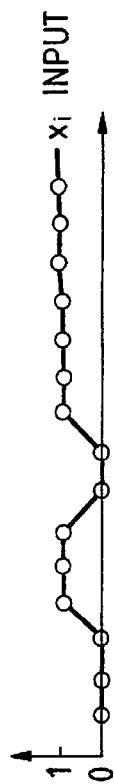
Figure 19A:
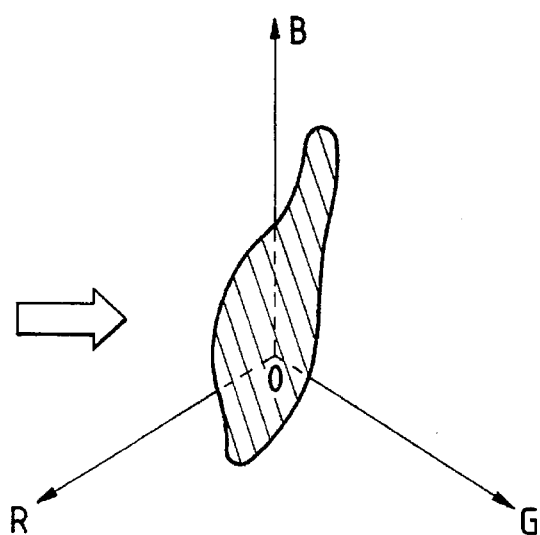
FIGS. 19A and 19B are diagrams for explaining the relations between specific originals and a color space.
Figure 19B:
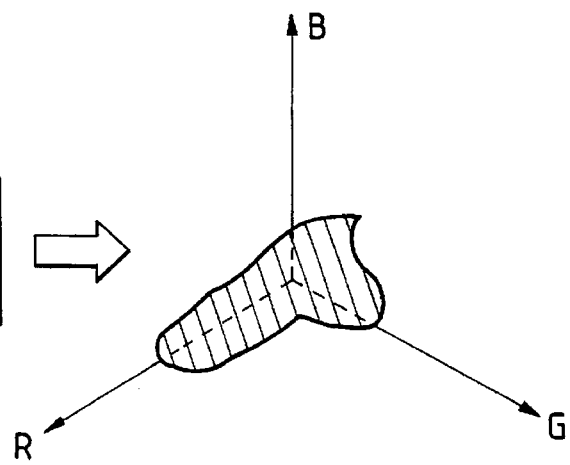
Figure 20:
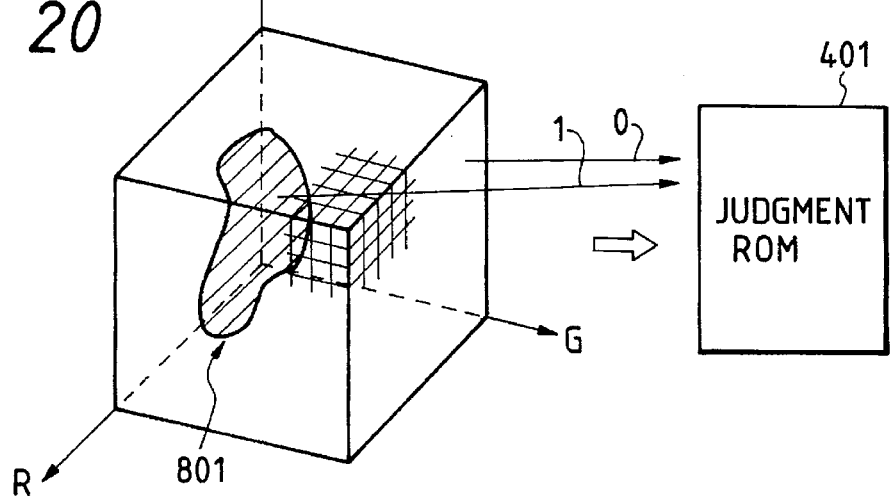
FIG. 20 is a diagram for explaining the relation between color space data of a specific original and a judgment ROM 2401.
Figure 21:
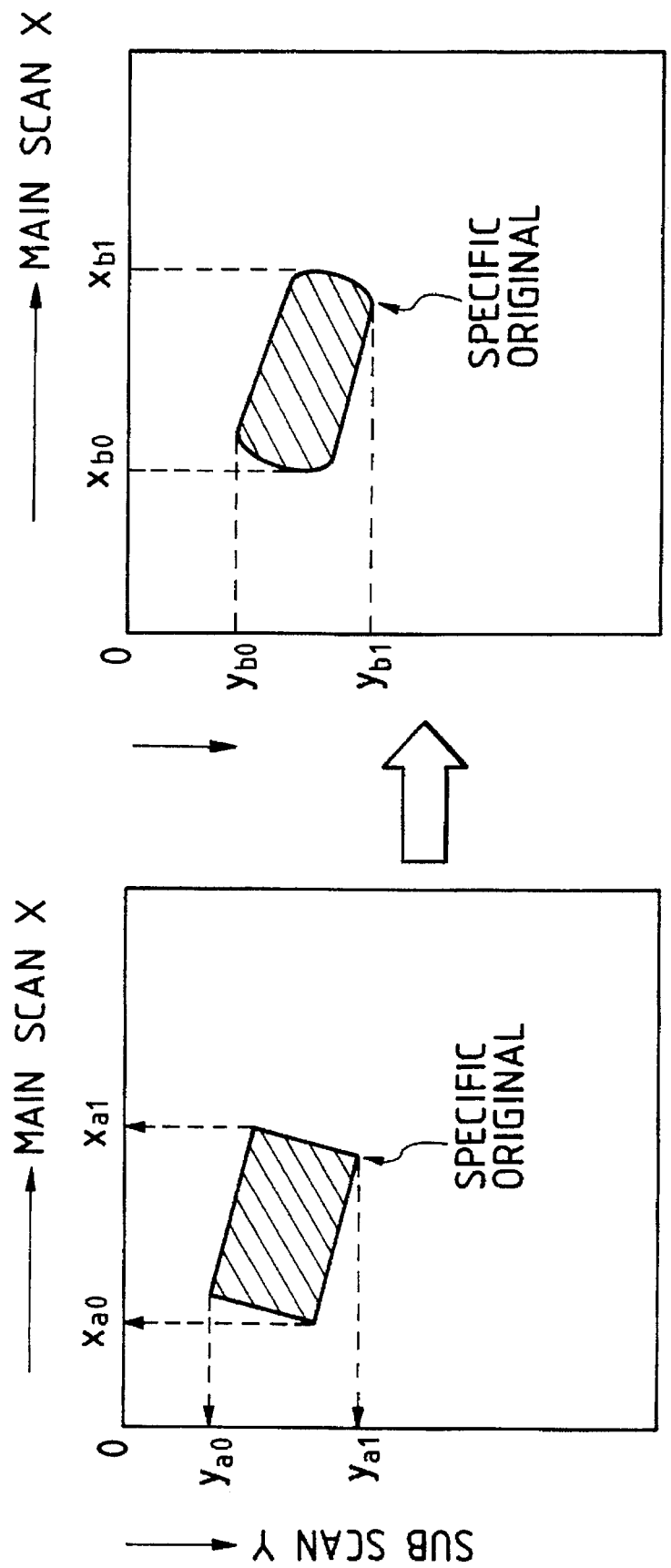
FIG. 21 is a diagram showing the positional relation between a specific original and a recognition area.
Figure 25:
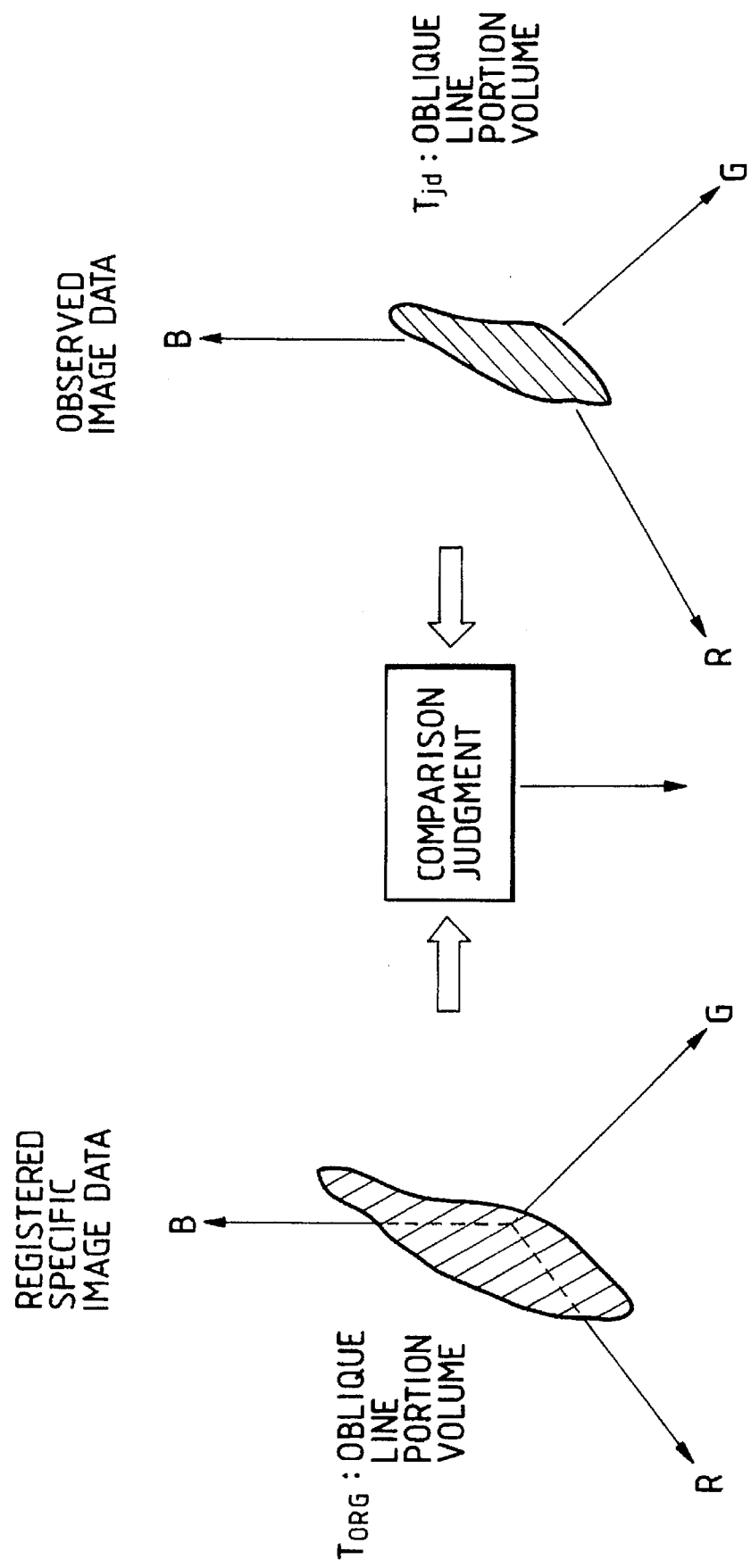
FIG. 25 is a diagram for explaining a method of judging a specific original by using a color space.

FIG. 16A is a block diagram showing a construction of the specific original judgment unit 2112 shown in FIG. 13. FIG. 17 is a block diagram showing typical constructions of integrators 4011 to 4018. FIGS. 18A and 18B are diagrams for explaining integrating effects according to the sixth embodiment. FIGS. 19A and 19B are diagrams for explaining the relations between the specific originals and the color spaces. FIG. 20 is a diagram showing the relation between the color space data of a specific original and the data in a judgment ROM 2401. FIG. 21 is a diagram showing the positional relation between the specific original and the recognition area. FIG. 25 is a diagram for explaining a judging method of a specific original by using a color space.

In FIG. 16A, the judgment ROM 2401 is constructed by a read only memory of a data width of 8 bits and an address width of 15 bits. Data corresponding to eight kinds of predetermined specific originals are sotred into the ROM 2401.

R, G, and B color image signals supplied from the image scanner unit 1201 are sent as address signals of the judgment ROM 2401. Information indicating whether the image data of the specific originals shown in FIGS. 19A, 19B, and 20 exist in the corresponding R, G, and B spaces or not has been stored in the judgment ROM 2401. In the case where the colors shown by input color signals 2313, 2314, and 2315 are included in color distribution ranges of the image portions of specific originals A and B in the hatched portions in the RGB spaces shown in FIGS. 19A and 19B, an output signal of the judgment ROM 2401 is set to 1. Otherwise, the output signal is set to 0.

The judgment information generated from the ROM 2401 is supplied to the integrators 4011 to 4018 through a latch circuit 2402.

Since the integrators 4011 to 4018 have the same construction, the integrator 4011 will now be described as a typical example.

FIG. 17 is a block diagram for explaining the integrator 4011.

In FIG. 17, reference numerals 2501 and 2504 denote multipliers; 2502 an adder; and 2503 a latch circuit to adjust a timing. The multiplier 2504 executes a multiplication of $x_i \times 255(1-\beta)$ on the ith signal $x_i$ (0 or 1), which is supplied by using a predetermined weight coefficient $\beta$. The result of the multiplication is supplied to a B side of the adder 2502. On the other hand, the multiplier 2501 executes a multiplication of $Y_{i-1} \times \beta$ on the (i-1)th output signal $Y_{i-1}$, which is supplied from the latch circuit 2503. The result of this multiplication is supplied to an A side of the adder 2502. The adder 2502 performs an addition of $x_i \times 255(1-\beta)+Y_{i-1} \times \beta$ and generates the result of the addition as yi. That is, the integrator 4011 executes an integration expressed by the following equation (2), $$Y_i = x_i \times 255(1-\beta) + Y_{i-1} \times \beta \quad (2)$$

for all of the input data.

By executing the above integration, in the case where the input value "1" to the integrator 4011 continues as shown in FIG. 18B, the output value from the integrator 4011 approaches 255 as shown in FIG. 18A. On the other hand, in the case where the input value "0" continues, the output value approaches 0.

Since comparison arithmetic units 4001 to 4008 have the same construction, the comparison arithmetic unit 4001 will now be described as a typical example. A magnitude of an output value A from the integrator 4011 is compared with a magnitude of a predetermined constant value B stored in a register 4021. A judgment signal $C_1$ indicative of the result of the comparison is generated in accordance with the following conditions (3).

$$C_1 = 1 (A_1 > B_1)$$
$$C_1 = 0 (A_1 \leq B_1) \quad (3)$$

From the above process, in the case where the input color signals continuously coincide with the image data of the specific original, the output signal $C_1$ from the comparison arithmetic unit 4001 is set to 1. The other comparison arithmetic units 4002 to 4008 and registers 4022 to 4028 also function in a manner similar to the comparison arithmetic unit 4001 and the register 4021.

Counters 2421 to 2428 also have the same construction. The counter 2421 is counted up only when the output signal $C_1$ is set to 1. The counter 2421 counts the number of pixels included in a specific original recognition area corresponding to a hatched portion in FIG. 21.

An OR write circuit 2411 calculates the ORs of output signals $C_1$ to $C_8$ of the comparison arithmetic units 4001 to 4008 and writes the ORs into a RAM 2412. The RAM 2412 has the same size as that of the judgment ROM 2401 and has a bit width of 8 bits and an address width of 16 bits.

Figure 16B:
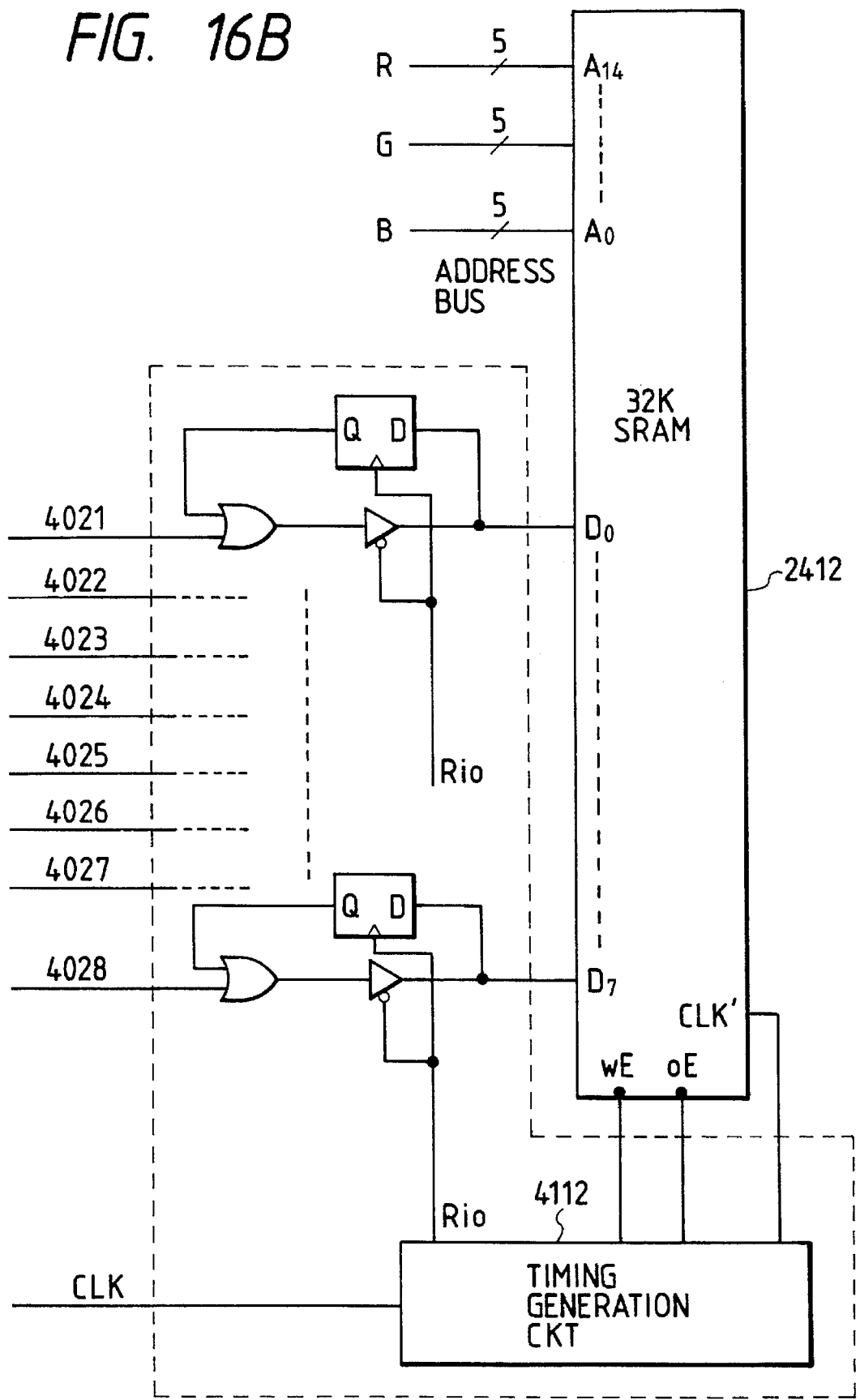
FIG. 16B is a block diagram showing a construction of an OR write circuit 2411.
Figure 16C:
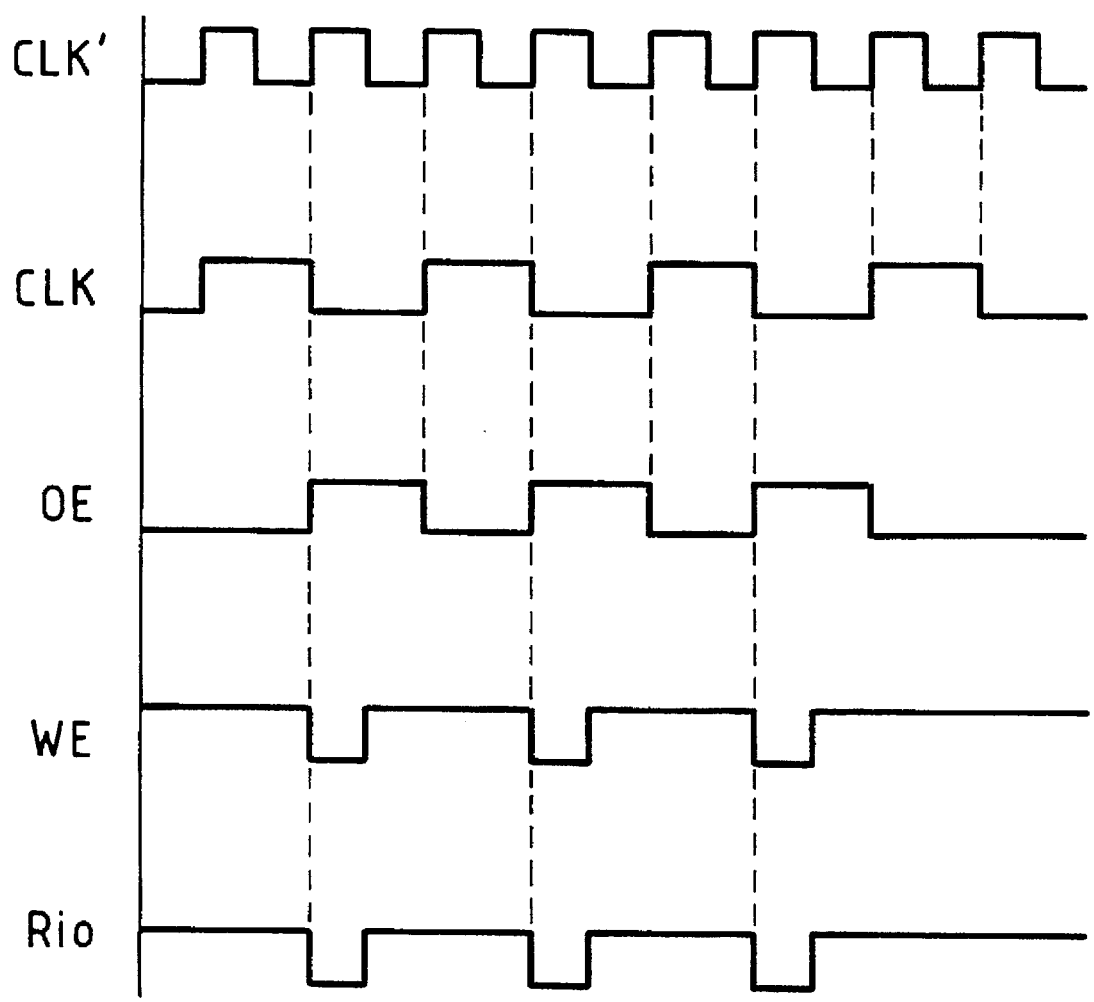
FIG. 16C is a timing chart of a timing generation circuit to generate timing signals.

FIG. 16B is a block diagram showing a construction of the OR write circuit 2411. Reference numeral 2412 denotes an SRAM of 32K. The signals of R, G, and B each consisting of five bits are supplied to input terminals $A_0$ to $A_{14}$ as address buses. Data 4021 to 4028 after completion of the OR calculations, which will be explained hereinlater, are supplied to input terminals $D_0$ to $D_7$ as data. Reference numeral 4112 denotes a timing generation circuit to generate timing signals shown in FIG. 16C.

In the OR arithmetic operating section in the hatched region, the stored data is read out of the input terminals $D_0$ to $D_7$ in response to a read enable signal OE at timings of the clock CLK' with respect to the addresses designated by the input signals to the input terminals $A_0$ to $A_{14}$ and is latched into latch circuits. On the other hand, the OR circuits calculate the ORs of the input signals 4021 to 4028 and the latched memory data. The calculated ORs are generated from the buffer memory at an inverter timing $R_{io}$.

If at least one of the data which are sequentially input by the input signals 4021 to 4028 for the addresses which are specified by the R, G, and B signals each consisting of five bits is equal to "1", the "1" data is stored into the SRAM 2412.

Since the input signals $D_0$ to $D_7$ are stored into the independent addresses, the judging process can be executed in parallel for the eight kinds of specific originals.

By counting the number of bits "1" as a result of the judgment stored in the RAM 2412, a volume in the RGB space of the hatched portion as count data in FIG. 25 is calculated.

In FIG. 16A, reference numeral 2415 denotes a CPU to control the whole specific original judgment unit 2112; 2415a a ROM in which a program according to a flowchart of FIG. 15 and the like by which the CPU 2415 operates have been stored; and 2415b a RAM which is used as a work area of various programs. The CPU 2415 mainly reads the data of the counters 2421 to 2428 and the RAM 2412 and discriminates whether a target original exists in the input originals or not.

An input of the integrator in FIG. 17 is shown by $X_i$ and an output is shown by $Y_i$ ($1 \leq i \leq 8$). A calculating process according to the following equation (4) is performed:

$$Y_{i+1} = \beta \cdot Y_i + 255(1-\beta)X_i \quad (4)$$

In the above equation (4), $\beta$ denotes a constant to control an integrating effect of the integrator. The following relation is satisfied within a range of $0 < \beta < 1$:

| 0 | ← | $\beta$ | → | 1 |
|---|---|---------|---|---|
| (small) | | (integrating effect) | | (large) |

That is, an integration value change curve slowly changes as a set value of $\beta$ shown in FIG. 18B approaches 1. On the contrary, as the set value of $\beta$ approaches 0, the change curve suddenly changes. In the embodiment, $\beta = 31/32$.

A recognition object is set by presuming an original of a size as large as a bank note. However, if a smaller original image such as a stamp or the like is used as a recognition object, it is proper to set $\beta$ to a smaller value such as ⅛. The value of $\beta$ can be also set to an arbitrary value in accordance with a recognition object by a scan unit (not shown).

<Sixth embodiment>

FIG. 15 is a flowchart for explaining the control by the CPU 2415 in the sixth embodiment.

First, when information to start the reading of the original is detected, an INH signal 2404 is set to "0" in step S1201 at the start of the reading of the original. After that, the reading of the original is instructed in step S1202. In step S1203, a variable n is set to 1. That is, a count value of the nth counter is sequentially stored into the RAM 2412. In step S1204, the value of the counter in FIG. 16A, in this case, the value of the counter 2421 because n=1 is read and is stored into a variable area set in the RAM 2412.

In step S1205, the total number of "1" data stored in the variable area in the RAM 2412 in FIG. 16A is calculated. The total number is set to a variable vol.

Figure 24:
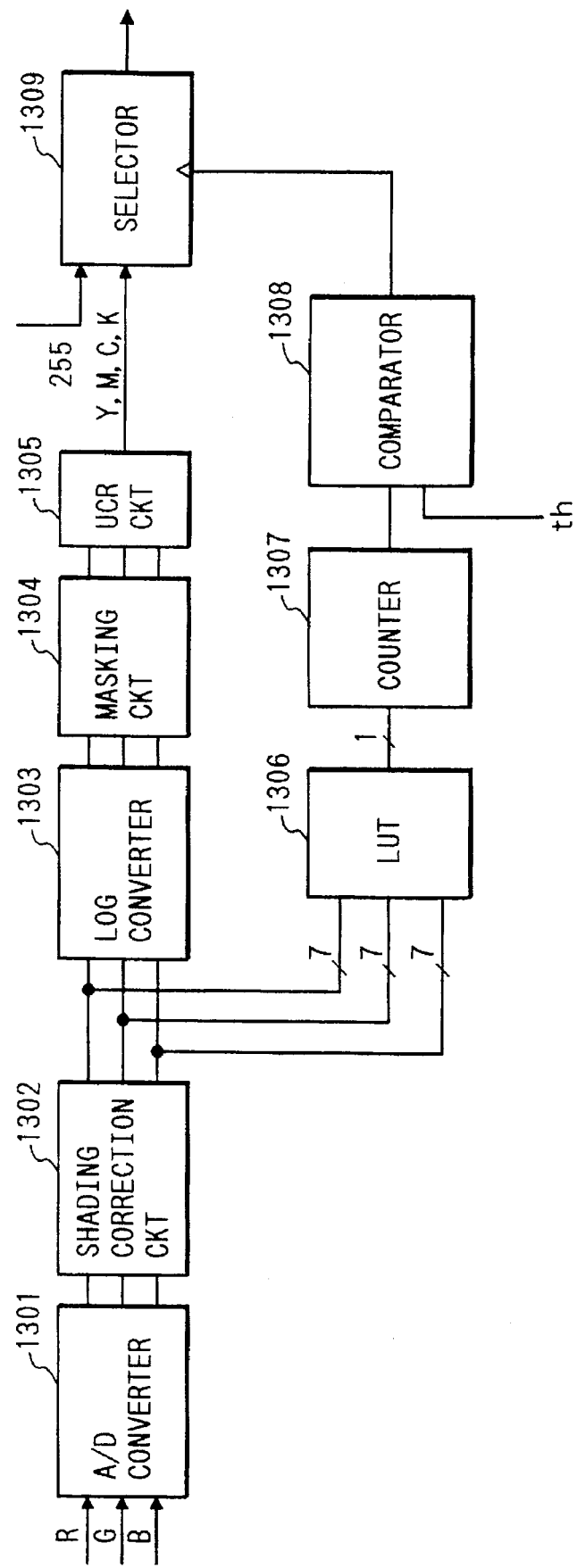
FIG. 24 is a block diagram showing a construction of an image scanner unit according to a conventional example.

The variable vol denotes a value indicative of a volume of the hatched portion in FIG. 24, that is, vol=$T_{jd}$.

In step S1206, a check is made to see if the value of the variable area is equal to or larger than a predetermined constant K or not.

The value of the variable area corresponds to the number of pixels in the recognition area shown in the hatched portion in FIG. 21. Therefore, by comparing a magnitude of the value of the variable area with a magnitude of the constant K, the presence or absence of a possibility such that the input image relates to a bank note original is discriminated. That is, when the variable area value is larger than K, it is determined that there is a possibility such that the input image relates to the bank note original.

In step S1207, the value of the variable vol which has been set in step S1205 and a similarity r between the measured image data in the color space shown by the following equation (5) and the image data of the specific original are calculated and the similarity r is compared with the constant β.

In FIG. 25, $T_{ORG}$ denotes image data of a specific original (hereinafter, referred to as specific image data) which has previously been registered and corresponds to the hatched portion displayed in the RGB space and indicates a volume among the RGB coordinate space. $T_{jd}$ denotes image data of the read original (hereinafter, referred to as measured image data) and corresponds to a hatched portion in which the measured image data such that the output signals of the comparison arithmetic units 4001 to 4008 are set to 1 has been displayed in the RGB space. $T_{jd}$ indicates a volume in the RGB coordinate space. The similarity r in the above case is expressed by the following equation (5):

$$r = \frac{T_{jd}}{T_{ORG}} \quad (5)$$

As the value of the similarity r approaches 1, the similarity between the measured image data and the specific image data is high.

$$r = \frac{vol}{T_{ORG}} \leq \gamma \quad (6)$$

(where γ (gamma) indicates a constant which is determined by experiments and denotes a matching ratio in the color space; it is, assumed that γ=0.7) is discriminated. If a result of the discrimination is true, it is decided that the similarity between the measured image data and the specific image data is high and that the copy should be inhibited.

In the above construction, outputs of the flip-flops 2202a, 2202b, and 2202c in FIG. 14 are data obtained by thinning out the image signal into ¼. Therefore, it is sufficient to also set an operating speed of the LUT (lookup table) of the judgment ROM 2401 in FIG. 16A to a value which is ¼ of the speed in the conventional apparatus.

As mentioned above, in the extraction of the color components of the color original, the LUT of a large capacity can be constructed by an EPROM or the like of a relatively slow response speed. In other words, the balance between the capacity of the LUT and the response speed can be held.

<Seventh embodiment>

Figure 23:
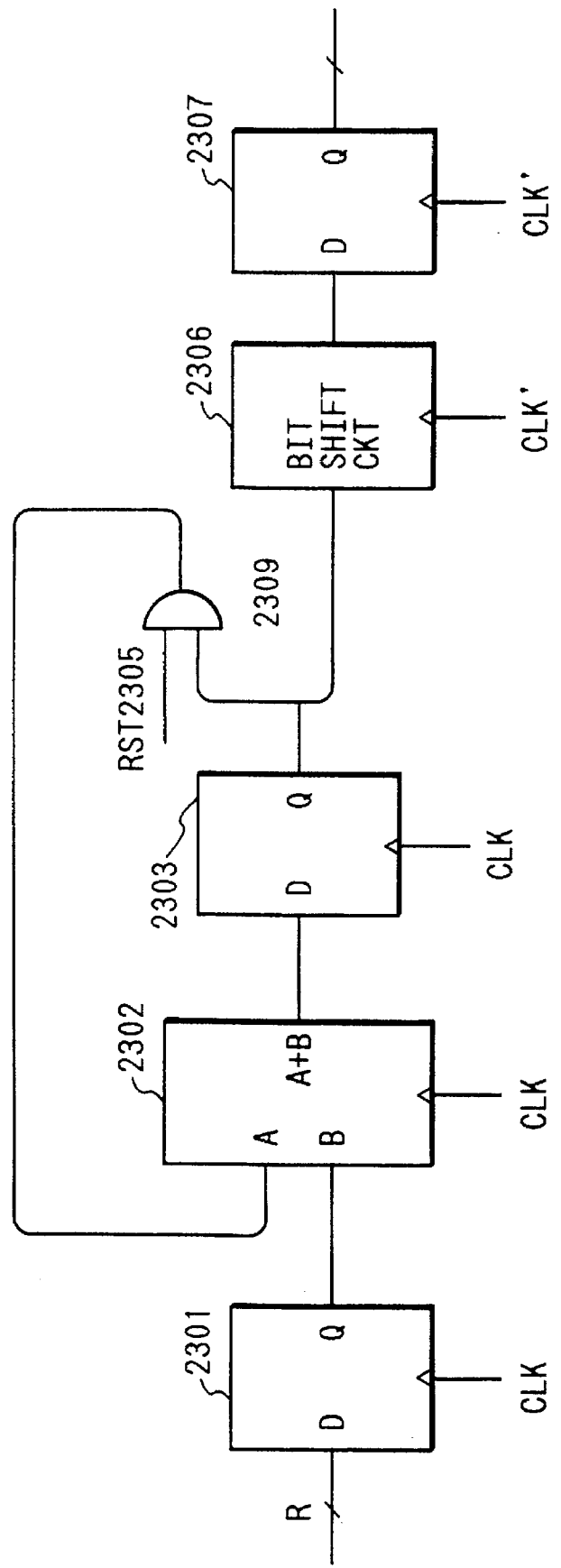
FIG. 23 is a block diagram showing a construction of a thinning circuit according to the seventh embodiment.

FIG. 23 is a block diagram showing a construction of the thinning circuit 2111 according to the seventh embodiment. Only the thinning circuit regarding R is shown here as a typical example of R, G, and B. The clocks CLK and CLK' are the same as those in FIG. 14. In FIG. 23, reference numeral 2301 denotes a flip-flop which operates by the clock CLK and holds the image signal before the thinning process is executed; 2302 an adder; 2303 a flip-flop to hold the result of the addition; and 2304 an AND gate to calculate the AND between a Q output signal of the flip-flop 2303 and a reset signal RST (2305) which is set to 0 every four periods of the clock CLK.

Reference numeral 2306 denotes a bit shift circuit to multiply the result of the addition from the adder 2302 by ¼ time and 2307 indicates a flip-flop which operates by the clock CLK'. In the above construction, the mean value of four adjacent pixels are generated every four periods of the clock CLK. The smoothing process of four pixels is also executed simultaneously with the thinning-out process. As mentioned above, the thinning circuit according to the seventh embodiment obtains an addition mean value of the time-sequential image data of predetermined n clocks and subsequently samples.

In the above case, random noises included in the original image signal are eliminated and a color judging accuracy is improved.

As described above, according to the invention, in the extraction of the color components of a color original, the LUT of a large capacity can be constructed by an EPROM or the like of a relatively slow response speed. In other words, the balance between the capacity of the LUT and the response speed can be held.

The present invention is not limited to the foregoing embodiments but many modifications and variations are possible within the spirit and scope of the appended claims of the invention.

What is claimed is:

1. An image processing apparatus, comprising:
   a) input means for inputting color image information of pixels representing an original image;
   b) memory means for storing reference color information which represents a plurality of colors included in a predetermined color image, the predetermined color image including a predetermined color figure;
   c) judging means for judging whether a color represented by the color image information input by said input means is one of the plurality of colors represented by said reference color information;
   d) counting means for counting the number of different colors which are included in both the color image information input by said input means and the reference color information stored in said memory means;
   e) discriminating means for discriminating whether the input image represented by the color image information includes the predetermined color image including the predetermined color figure or not in accordance with the number of different colors counted by said counting means; and
   f) output means for outputting a discrimination result obtained by said discriminating means.

2. An apparatus according to claim 1, wherein the color image information comprises a plurality of color component signals.

3. An apparatus according to clam 1, wherein said output means outputs a discrimination signal which is used for controlling an image processing apparatus.

4. An apparatus according to claim 1, wherein the predetermined color image is a bank note.

5. An apparatus according to claim 1, further comprising processing means which includes image forming means for forming a visible image in accordance with the color image information and the discrimination result obtained by said discriminating means.

6. An apparatus according to claim 5, wherein said image forming means is a laser beam printer.

7. An image processing method comprising the steps of:
   a) inputting color image information of pixels representing an input image;

b) judging whether a color represented by the color image information of the pixel is one of a plurality of colors represented by reference color information stored in a memory, the plurality of colors being included in a predetermined color image which includes a predetermined color figure;

c) repeating said steps a) and b) and counting the number of different colors which are included in both the color image information and the reference color information;

d) discriminating whether the input image represented by the color image information includes the predetermined color image including the predetermined figure or not in accordance with the number of different colors counted in said counting step; and e) outputting a discrimination result obtained in said discriminating step.

8. A method according to claim 7, wherein the color image information is input by image reading means comprising a CCD sensor.

9. A method according to claim 7, wherein the color image information comprises a plurality of color component signals.

10. A method according to claim 7, wherein the discrimination result is used for controlling an image processing apparatus.

11. An apparatus according to claim 7, wherein the predetermined color image is a bank note.

12. A method according to claim 7, further comprising the step of processing the color image information in accordance with the result of the discrimination in said discriminating step.

* * * * *

UNITED STATES PATENT AND TRADEMARK OFFICE
CERTIFICATE OF CORRECTION

| | | |
|---|---|---|
| PATENT NO. : | 5,633,952 | Page 1 of 4 |
| DATED : | May 27, 1997 | |
| INVENTOR(S) : | KENICHI OUTA, ET AL. | |

It is certified that error appears in the above-identified patent and that said Letters Patent is hereby corrected as shown below:

COLUMN 1

Line 20, "crime" should be deleted.

Line 40, "(e.g.," should read --, e.g.,--, and "issuing," should read --issuing--.

COLUMN 3

Line 5, "a" should be deleted.

Line 56, "1B" should read --1B,--.

COLUMN 4

Line 3, "8B" should read --8B,--.

COLUMN 5

Line 1, "FIG." should read --FIGS.--.

Line 42, "sub scanning" should read --sub-scanning--, and "has" should read --has been--.

Line 65, "scans" should read --is scanned--, and "photo sensitive" should read --photo-sensitive--.

UNITED STATES PATENT AND TRADEMARK OFFICE
CERTIFICATE OF CORRECTION

PATENT NO. : 5,633,952

DATED : May 27, 1997

INVENTOR(S) : KENICHI OUTA, ET AL.

It is certified that error appears in the above-identified patent and that said Letters Patent is hereby corrected as shown below:

COLUMN 6

Line 27, "$B^{b32}$" should read --$B_{b32}$--.

Line 50, "$\alpha$" (second occurrence) should read --$\beta$--.

Line 55, "$\beta$" should read --$\beta$ being used--.

COLUMN 8

Line 38, "FIG." should read --FIGS.--.

Line 46, "a" should read --the--, and "the" should read --a--.

COLUMN 9

Line 11, "On" should read --on--.

Line 39, "of" should be deleted.

Line 47, "is" should read --in--.

COLUMN 10

Line 8, "of" (first occurrence) should read --of the--.

Line 30, "this" should read --the--.

Line 31, "the" should read --this--.

UNITED STATES PATENT AND TRADEMARK OFFICE
CERTIFICATE OF CORRECTION

PATENT NO. : 5,633,952
DATED : May 27, 1997
INVENTOR(S) : KENICHI OUTA, ET AL.

It is certified that error appears in the above-identified patent and that said Letters Patent is hereby corrected as shown below:

COLUMN 11

Line 62, "or" should read --or the--, and "the original" should read --originals--.

COLUMN 12

Line 10, "an" should read --a--.

COLUMN 14

Lines 8-9, "photo sensitive" should read --photo-sensitive--.

Line 14, "are" should be deleted.

Lines 14-15 "photo sensitive" should read --photo-sensitive--.

Line 43, "sotred" should read --stored--.

COLUMN 15

Line 1, "supplied" should read --supplied,--.

Line 2, "by" should be deleted.

UNITED STATES PATENT AND TRADEMARK OFFICE
CERTIFICATE OF CORRECTION

PATENT NO. : 5,633,952
DATED : May 27, 1997
INVENTOR(S) : KENICHI OUTA, ET AL.

It is certified that error appears in the above-identified patent and that said Letters Patent is hereby corrected as shown below:

COLUMN 16

Line 15, "a" should read --an--.
Line 17, "a" should read --an--.
Line 29, "0<62<1:" should read --$0<\beta<1$--.

COLUMN 17

Line 30, insert --since vol = $T_{jd}'$--.
Line 45, "1/4" should read --1/4 of--.

COLUMN 20

Line 9, "An apparatus" should read --A method--.

Signed and Sealed this

Ninth Day of December, 1997

Attest:

BRUCE LEHMAN

*Attesting Officer*     Commissioner of Patents and Trademarks